US012682844B2

(12) United States Patent
Yuan et al.

(10) Patent No.: US 12,682,844 B2
(45) Date of Patent: Jul. 14, 2026

(54) PIXEL CIRCUIT, DISPLAY PANEL, DISPLAY APPARATUS, AND DRIVE METHOD

(71) Applicants: Chengdu BOE Optoelectronics Technology Co., Ltd., Chengdu (CN); BOE Technology Group Co., Ltd., Beijing (CN)

(72) Inventors: Changlong Yuan, Beijing (CN); Dongfang Yang, Beijing (CN); Xiaoxiao Wang, Beijing (CN); Zhenhua Zhang, Beijing (CN); Li Zhu, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/704,962

(22) PCT Filed: Feb. 20, 2023

(86) PCT No.: PCT/CN2023/077188
§ 371 (c)(1),
(2) Date: Apr. 26, 2024

(87) PCT Pub. No.: WO2024/174064
PCT Pub. Date: Aug. 29, 2024

(65) Prior Publication Data

US 2025/0273139 A1 Aug. 28, 2025

(51) Int. Cl.
*G06F 3/038* (2013.01)
*G09G 3/3233* (2016.01)

(52) U.S. Cl.
CPC ... *G09G 3/3233* (2013.01); *G09G 2300/0819* (2013.01); *G09G 2300/0852* (2013.01);
(Continued)

(58) Field of Classification Search
CPC ......... G09G 3/3233; G09G 2300/0819; G09G 2300/0852
(Continued)

(56) References Cited

U.S. PATENT DOCUMENTS

2019/0259331 A1 8/2019 Su
2020/0118494 A1* 4/2020 Park ..................... G09G 3/3258
(Continued)

FOREIGN PATENT DOCUMENTS

CN 103745690 A 4/2014
CN 106887210 A 6/2017
(Continued)

*Primary Examiner* — Jonathan M Blancha
(74) *Attorney, Agent, or Firm* — ArentFox Schiff LLP; Michael Fainberg

(57) ABSTRACT

Disclosed are a pixel circuit, a display panel, a display apparatus, and a drive method. The pixel circuit includes: a light emitting device; a drive transistor configured to generate current driving the light emitting device according to data voltage; a coupling control circuit configured to stabilize voltages of first node and gate electrode of the drive transistor and turn on the first node and second electrode of the drive transistor in response to signal of light emitting control signal end; a signal writing circuit configured to provide signal of data signal end for the first node in response to signal of a scanning signal end and provide signal of first power end for first electrode of the drive transistor in response to signal of light emitting control signal end; a threshold compensation circuit configured to write threshold voltage of the drive transistor to the gate electrode of the drive transistor.

19 Claims, 18 Drawing Sheets

(52) U.S. Cl.
CPC . *G09G 2300/0861* (2013.01); *G09G 2310/08* (2013.01); *G09G 2320/0233* (2013.01)

(58) Field of Classification Search
USPC .......................................................... 345/214
See application file for complete search history.

(56) References Cited

U.S. PATENT DOCUMENTS

| | | | | |
|---|---|---|---|---|
| 2023/0165056 | A1 * | 5/2023 | Kang | H10D 86/481<br>257/40 |
| 2023/0267882 | A1 * | 8/2023 | Yang | G09G 3/3233 |

FOREIGN PATENT DOCUMENTS

| | | | |
|---|---|---|---|
| CN | 113487996 | A | 10/2021 |
| CN | 114255708 | A | 3/2022 |
| CN | 114648948 | A | 6/2022 |
| CN | 114822362 | A | 7/2022 |
| CN | 115394254 | A | 11/2022 |
| CN | 115700868 | A | 2/2023 |
| KR | 10-2021-0058232 | A | 5/2021 |
| KR | 10-2021-0084097 | A | 7/2021 |

* cited by examiner

PIXEL CIRCUIT, DISPLAY PANEL, DISPLAY APPARATUS, AND DRIVE METHOD

CROSS-REFERENCE TO RELATED APPLICATIONS

This disclosure is a National Stage of International Application No. PCT/CN2023/077188, filed Feb. 20, 2023, which is hereby incorporated by reference in its entirety.

TECHNICAL FIELD

The disclosure relates to the technical field of display, and particularly relates to a pixel circuit, a display panel, a display apparatus, and a drive method.

BACKGROUND

Due to advantages of self-luminescence and low energy consumption, light emitting devices, such as an organic light emitting diode (OLED), a quantum dot light emitting diode (QLED), a micro light emitting diode (Micro LED) and a mini light emitting diode (Mini OLED), have become a hot topic in the application research field of display apparatuses. In general display apparatuses, the light emitting devices are driven to emit light by pixel circuits.

SUMMARY

A pixel circuit according to an embodiment of the disclosure includes:

a light emitting device;

a drive transistor configured to generate a current for driving the light emitting device to emit light according to a data voltage;

a coupling control circuit coupled to a first node and a gate electrode and a second electrode of the drive transistor, and configured to stabilize voltages of the first node and the gate electrode of the drive transistor and to turn on the first node and the second electrode of the drive transistor in response to a signal of a light emitting control signal end;

a signal writing circuit coupled to the first node, and configured to provide a signal of a data signal end for the first node in response to a signal of a scanning signal end and to provide a signal of a first power end for a first electrode of the drive transistor in response to the signal of the light emitting control signal end; and a threshold compensation circuit coupled to the drive transistor and configured to write a threshold voltage of the drive transistor to the gate electrode of the drive transistor.

In some possible implementations, the coupling control circuit includes: a first coupling sub-circuit, a second coupling sub-circuit, and a turning-on control circuit.

The first coupling sub-circuit is configured to stabilize the voltage of the gate electrode of the drive transistor and stabilize a voltage of a second node.

The second coupling sub-circuit is configured to stabilize the voltage of the second node and stabilize the voltage of the first node.

The turning-on control circuit is configured to turn on the first node and the second electrode of the drive transistor in response to the signal of the light emitting control signal end.

In some possible implementations, the first coupling sub-circuit includes: a first capacitor.

A first electrode plate of the first capacitor is coupled to the gate electrode of the drive transistor. A second electrode plate of the first capacitor is coupled to the second node.

In some possible implementations, the second coupling sub-circuit includes: a second capacitor.

A first electrode plate of the second capacitor is coupled to the second node. A second electrode plate of the second capacitor is coupled to the first node.

In some possible implementations, the turning-on control circuit includes: a first transistor.

A gate electrode of the first transistor is coupled to the light emitting control signal end. A first electrode of the first transistor is coupled to the first node. A second electrode of the first transistor is coupled to the second electrode of the drive transistor.

In some possible implementations, the second electrode of the drive transistor is directly coupled to the light emitting device.

In some possible implementations, the second electrode of the drive transistor is connected to the light emitting device by means of the first transistor, and the light emitting device is coupled to the first node.

In some possible implementations, the turning-on control circuit further includes: a second transistor. The second electrode of the drive transistor is connected to the light emitting device sequentially by means of the first transistor and the second transistor.

A gate electrode of the second transistor is coupled to the light emitting control signal end. A first electrode of the second transistor is coupled to the first node. A second electrode of the second transistor is coupled to the light emitting device.

In some possible implementations, the threshold compensation circuit is further configured to initialize the first node, the second node, and the gate electrode, the first electrode and the second electrode of the drive transistor.

In some possible implementations, the threshold compensation circuit includes: a first threshold compensation sub-circuit, a second threshold compensation sub-circuit, and a third threshold compensation sub-circuit.

The first threshold compensation sub-circuit is configured to provide a signal of the second electrode of the drive transistor or a signal of a first initialization signal end for the second node in response to a signal of a first compensation control signal end.

The second threshold compensation sub-circuit is configured to turn on the gate electrode and the first electrode of the drive transistor in response to a signal of a second compensation control signal end.

The third threshold compensation sub-circuit is configured to provide a signal of a second initialization signal end or a signal of the second node for the second electrode of the drive transistor in response to a signal of a third compensation control signal end.

In some possible implementations, in one display frame, maintenance duration of an effective level of at least one of the first compensation control signal end, the second compensation control signal end and the third compensation control signal end is longer than that of an effective level of the scanning signal end.

In some possible implementations, in one display frame, an effective level of at least one of the first compensation control signal end, the second compensation control signal end and the third compensation control signal end has overlapping duration with an effective level of the scanning signal end.

In some possible implementations, the first threshold compensation sub-circuit includes: a third transistor.

A gate electrode of the third transistor is coupled to the first compensation control signal end. A first electrode of the third transistor is coupled to the second node. A second electrode of the third transistor is coupled to the second electrode of the drive transistor or the first initialization signal end.

In some possible implementations, the second threshold compensation sub-circuit includes: a fourth transistor.

A gate electrode of the fourth transistor is coupled to the second compensation control signal end. A first electrode of the fourth transistor is coupled to the gate electrode of the drive transistor. A second electrode of the fourth transistor is coupled to the first electrode of the drive transistor.

In some possible implementations, the third threshold compensation sub-circuit includes: a fifth transistor.

A gate electrode of the fifth transistor is coupled to the third compensation control signal end. A first electrode of the fifth transistor is coupled to the second initialization signal end. A second electrode of the fifth transistor is coupled to the second electrode of the drive transistor.

In some possible implementations, at least two of the first compensation control signal end, the second compensation control signal end and the third compensation control signal end are the same signal end.

In some possible implementations, the first initialization signal end and the second initialization signal end are the same signal end.

In some possible implementations, a cathode of the light emitting device is coupled to a second power end.

At least one of the first initialization signal end and the second initialization signal end is the same signal end as the second power end.

In some possible implementations, the signal writing circuit includes: a sixth transistor and a seventh transistor.

A gate electrode of the sixth transistor is coupled to the scanning signal end. A first electrode of the sixth transistor is coupled to the data signal end. A second electrode of the sixth transistor is coupled to the first node.

A gate electrode of the seventh transistor is coupled to the light emitting control signal end. A first electrode of the seventh transistor is coupled to the first power end. A second electrode of the seventh transistor is coupled to the first electrode of the drive transistor.

In some possible implementations, the pixel circuit further includes: a reset circuit.

The reset circuit is configured to provide a signal of a third initialization signal end for the gate electrode of the drive transistor in response to a signal of the scanning signal end.

In some possible implementations, the reset circuit includes: an eighth transistor.

A gate electrode of the eighth transistor is coupled to the scanning signal end. A first electrode of the eighth transistor is coupled to the third initialization signal end. A second electrode of the eighth transistor is coupled to the gate electrode of the drive transistor.

An embodiment of the disclosure further provides a display panel. The display panel includes:

a plurality of sub-pixels. Each of the plurality of sub-pixels includes the pixel circuit.

In some possible implementations, the display panel further includes:

a plurality of scanning signal lines, where one of the plurality of scanning signal lines is coupled to a scanning signal end of a pixel circuit in a row of sub-pixels;

gate drive circuits coupled to the plurality of scanning signal lines respectively, where the gate drive circuits are configured to input gate drive signals to the plurality of scanning signal lines;

a plurality of light emitting control signal lines, where one of the plurality of light emitting control signal lines is coupled to a light emitting control signal end of a pixel circuit in a row of sub-pixels;

light emitting control circuits coupled to the plurality of light emitting control signal lines respectively, where the light emitting control circuits are configured to input light emitting control signals to the plurality of light emitting control signal lines;

a plurality of first compensation control signal lines, where one of the plurality of first compensation control signal lines is coupled to a first compensation control signal end of a pixel circuit in a row of sub-pixels; and first compensation control circuits coupled to the plurality of first compensation control signal lines respectively, where the first compensation control circuits are configured to input first compensation control signals to the plurality of first compensation control signal lines.

In some possible implementations, one of the plurality of first compensation control signal lines is coupled to a second compensation control signal end of a pixel circuit in a row of sub-pixels; and/or, one of the plurality of first compensation control signal lines is coupled to a third compensation control signal end of a pixel circuit in a row of sub-pixels.

An embodiment of the disclosure further provides a display apparatus. The display apparatus includes the display panel.

An embodiment of the disclosure further provides a drive method for the pixel circuit. The drive method involves: a threshold compensation and data writing stage and a light emitting stage in each of a plurality of consecutive display frames, and includes:

in the threshold compensation and data writing stage, writing, by a threshold compensation circuit, a threshold voltage of a drive transistor to a gate electrode of the drive transistor; providing, by a signal writing circuit, a signal of a data signal end for a first node in response to a signal of a scanning signal end; and stabilizing, by a coupling control circuit, voltages of the first node and the gate electrode of the drive transistor; and in the light emitting stage, providing, by the signal writing circuit, a signal of a first power end for a first electrode of the drive transistor in response to a signal of a light emitting control signal end; turning on, by the coupling control circuit, the first node and a second electrode of the drive transistor in response to the signal of the light emitting control signal end; stabilizing, by the coupling control circuit, the voltages of the first node and the gate electrode of the drive transistor; and generating, by the drive transistor, a drive current for driving a light emitting device to emit light according to a data voltage, so as to drive the light emitting device to emit light.

In some possible implementations, before the threshold compensation and data writing stage, the drive method further involves: an initialization stage, and includes:

in the initialization stage, providing, by the signal writing circuit, the signal of the first power end for the first electrode of the drive transistor in response to the signal of the light emitting control signal end; turning on, by the coupling control circuit, the first node and the second electrode of the drive transistor in response to the signal of the light emitting control signal end; stabilizing, by the coupling control circuit, the voltages of the first node and the gate electrode of the drive transistor; and initializing, by the threshold compensation circuit, the first node, a second node, and the gate electrode, the first electrode and the second electrode of the drive transistor.

DETAILED DESCRIPTION

Figure 1:
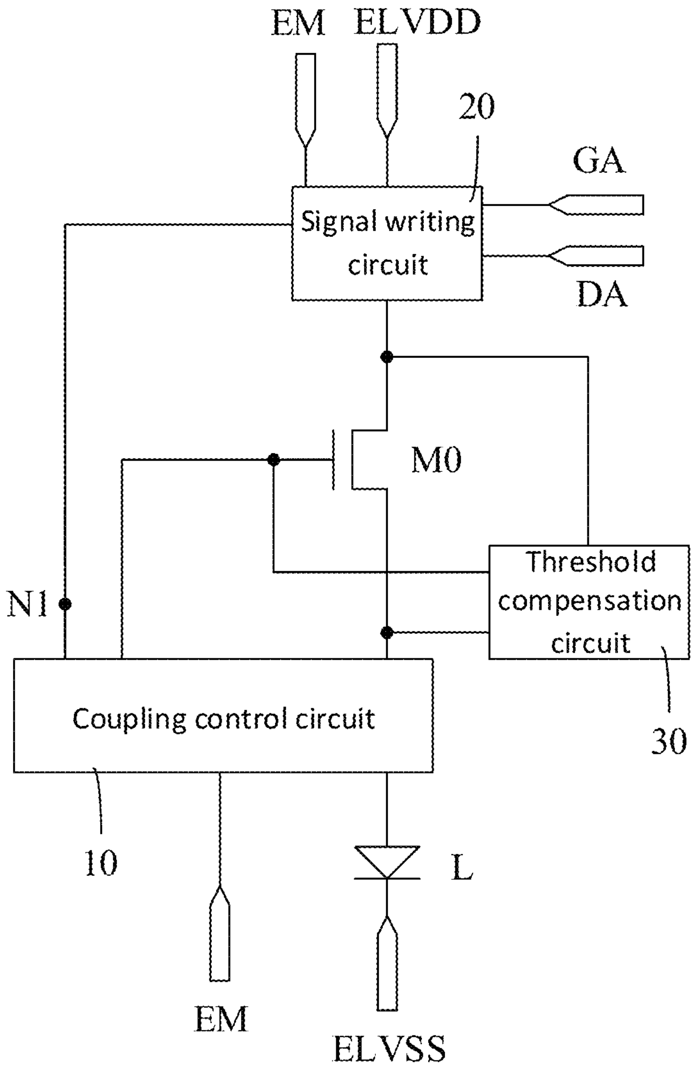
FIG. 1 is a schematic structural diagram of some pixel circuits according to an embodiment of the disclosure.

For making objectives, technical solutions and advantages of embodiments of the disclosure clearer, the technical solutions of the embodiments of the disclosure will be clearly and completely described below in conjunction with the accompanying drawings in the embodiments of the disclosure. Obviously, the embodiments described are some embodiments rather than all embodiments of the disclosure. The embodiments in the disclosure and features of the embodiments may be combined with each other without conflict. Based on the embodiments of the disclosure, all other embodiments obtained by those of ordinary skill in the art without making creative efforts fall within the protection scope of the disclosure.

Unless otherwise defined, technical or scientific terms used in the disclosure should have ordinary meanings as understood by those of ordinary skill in the art to which the disclosure belongs. "First", "second", and other similar words used in the disclosure do not indicate any order, amount or importance, but are only used to distinguish different components. "Include", "comprise", "involve" and other similar words indicate that elements or objects before the word include elements or objects after the word and their equivalents, without excluding other elements or objects. "Connect", "connected", and other similar words are not limited to physical or mechanical connections, but may include electrical connections, which may be direct or indirect.

It should be noted that a size and a shape of each figure in the drawings do not reflect a true scale, but only for illustrating contents of the disclosure. Throughout the drawings, identical or similar reference numerals denote identical or similar elements or elements having identical or similar functions.

A display apparatus according to an embodiment of the disclosure includes: a display panel. The display panel includes: a plurality of pixel units arranged in an array. For example, each pixel unit includes a plurality of sub-pixels. For example, each pixel unit may include a red sub-pixel, a green sub-pixel, and a blue sub-pixel, such that red, green and blue colors may be mixed to achieve color display. Alternatively, the pixel unit may include a red sub-pixel, a green sub-pixel, a blue sub-pixel, and a white sub-pixel, such that red, green, blue and white colors may be mixed to achieve color display. Clearly, in practical application, an emitting color of the sub-pixels in the pixel unit may be designed and determined according to an actual application environment, which is not limited herein.

In the embodiment of the disclosure, each sub-pixel includes a pixel circuit. The pixel circuit includes a drive transistor and a light emitting device, such that the light emitting device is driven to emit light, and further the display panel achieves an image display function. Due to factors such as a process and device aging, a threshold voltage Vth of the drive transistor is uneven, which leads to change of currents flowing through different light emitting devices and further uneven display brightness, such that a display effect of an entire image is influenced. Moreover, if a writing path of a data voltage and a compensation path of the threshold voltage Vth in a current pixel circuit are completely the same, writing time of the data voltage and compensation time of the threshold voltage Vth are also completely the same. However, time required for full compensation of the threshold voltage Vth is long, such that duration of an effective level of a signal that controls the data voltage to be written can be lengthened, which is not conducive to high-frequency driving.

Based on this, as shown in FIG. 1, a pixel circuit according to the embodiment of the disclosure includes: a light emitting device L, a drive transistor M0, a coupling control circuit 10, a signal writing circuit 20, and a threshold compensation circuit 30. The coupling control circuit 10 is coupled to a first node N1 and a gate electrode and a second electrode of the drive transistor M0. The signal writing circuit 20 is coupled to the first node N1. The threshold compensation circuit 30 is coupled to the drive transistor M0.

The drive transistor M0 is configured to generate a current for driving the light emitting device L to emit light according to a data voltage.

The coupling control circuit 10 is configured to stabilize voltages of the first node N1 and the gate electrode of the drive transistor M0 and to turn on the first node N1 and the second electrode of the drive transistor M0 in response to a signal of a light emitting control signal end EM.

The signal writing circuit 20 is configured to provide a signal of a data signal end DA for the first node N1 in response to a signal of a scanning signal end GA and to provide a signal of a first power end ELVDD for a first electrode of the drive transistor M0 in response to the signal of the light emitting control signal end EM.

The threshold compensation circuit 30 is configured to write a threshold voltage of the drive transistor M0 to the gate electrode of the drive transistor M0.

The embodiment of the disclosure provides the pixel circuit, threshold voltage drift of the drive transistor can be prevented from influencing light emission of the light emitting device through mutual cooperation of the coupling control circuit, the signal writing circuit, the threshold compensation circuit, and the drive transistor.

In addition, the embodiment of the disclosure provides the pixel circuit, a path of compensating for the threshold voltage of the drive transistor is different from a path of writing the data voltage through mutual cooperation of the coupling control circuit, the signal writing circuit, the threshold compensation circuit, and the drive transistor, such that threshold voltage compensation of the drive transistor and data voltage writing are conducted separately, and high-frequency driving can be implemented. Moreover, since a process of compensating for the threshold voltage of the drive transistor and a process of writing the data voltage are separated, the process of compensating for the threshold voltage may be conducted for a long time, such that the threshold voltage of the drive transistor can be better compensated for, and a drive speed can be increased, such as 120 Hz, 180 Hz, and 240 Hz, which is conducive to improvement in an effect of scenes in fields such as games; and precision of a drive current can be improved, display quality can be enhanced, and further light emitting stability and a display effect of the display panel can be improved.

Figure 2:
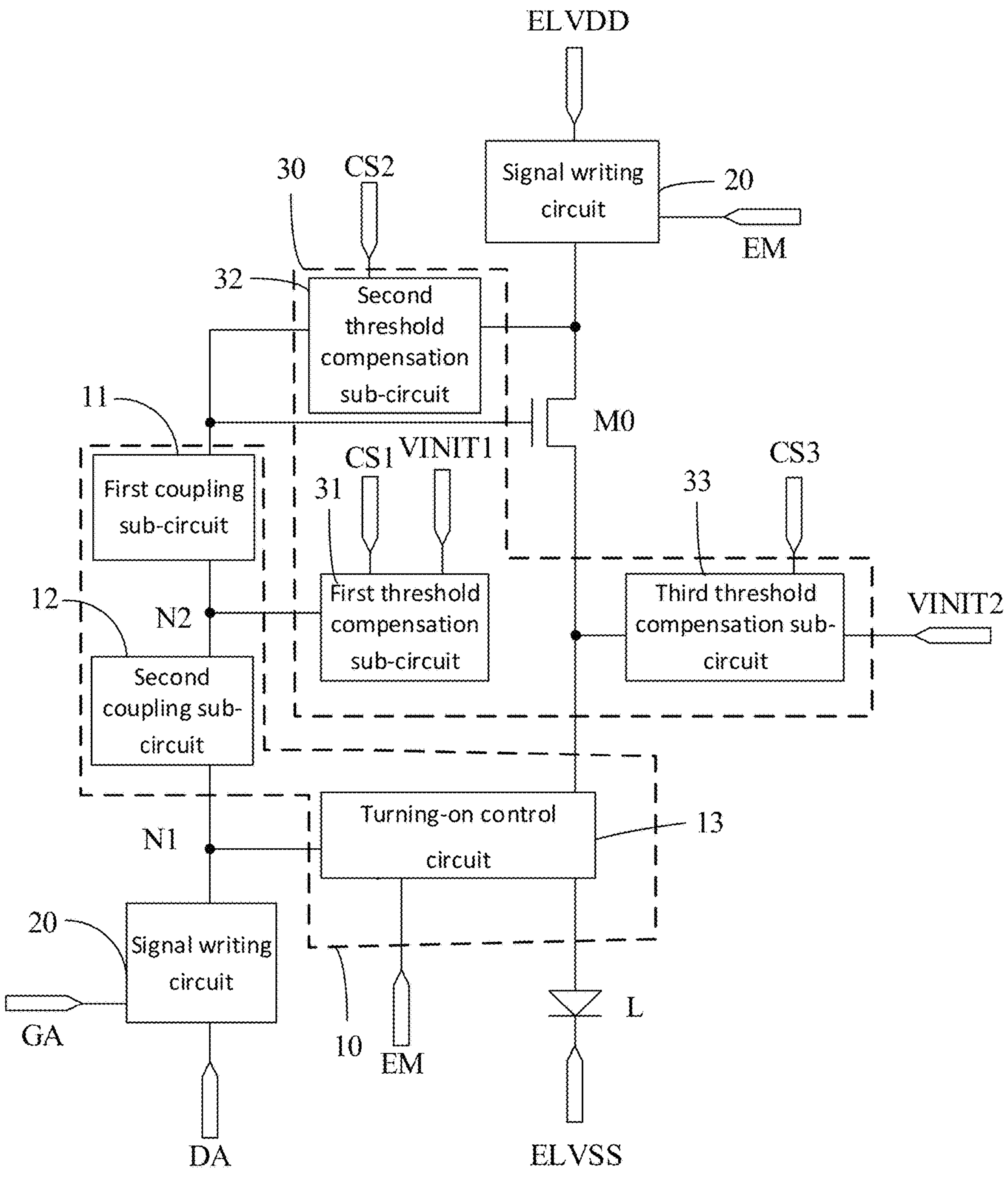
FIG. 2 is a schematic structural diagram of some other pixel circuits according to an embodiment of the disclosure.

In some embodiments of the disclosure, as shown in FIG. 2, the coupling control circuit 10 includes: a first coupling sub-circuit 11, a second coupling sub-circuit 12, and a turning-on control circuit 13.

The first coupling sub-circuit 11 is configured to stabilize the voltage of the gate electrode of the drive transistor M0 and stabilize a voltage of a second node N2.

The second coupling sub-circuit 12 is configured to stabilize the voltage of the second node N2 and stabilize the voltage of the first node N1.

The turning-on control circuit 13 is configured to turn on the first node N1 and the second electrode of the drive transistor M0 in response to the signal of the light emitting control signal end EM.

In some embodiments of the disclosure, the threshold compensation circuit 30 is further configured to initialize the first node N1, the second node N2, and the gate electrode, the first electrode and the second electrode of the drive transistor M0.

For example, as shown in FIG. 2, the threshold compensation circuit 30 includes: a first threshold compensation sub-circuit 31, a second threshold compensation sub-circuit 32, and a third threshold compensation sub-circuit 33.

The first threshold compensation sub-circuit 31 is configured to provide a signal of a first initialization signal end VINIT1 for the second node N2 in response to a signal of a first compensation control signal end CS1.

The second threshold compensation sub-circuit 32 is configured to turn on the gate electrode and the first electrode of the drive transistor M0 in response to a signal of a second compensation control signal end CS2.

The third threshold compensation sub-circuit 33 is configured to provide a signal of a second initialization signal end VINIT2 for the second electrode of the drive transistor M0 in response to a signal of a third compensation control signal end CS3.

The disclosure will be described in detail below in conjunction with specific embodiments. It should be noted that the embodiment is intended to better explain the disclosure, instead of limiting the disclosure.

In the embodiment of the disclosure, as shown in FIGS. 1 and 2, the drive transistor M0 may be set as an N-type transistor. The first electrode of the drive transistor M0 may be used as a source electrode, and the second electrode of the drive transistor M0 may be used as a drain electrode. Clearly, the drive transistor M0 may also be set as a P-type transistor, which is not limited herein.

Figure 3:
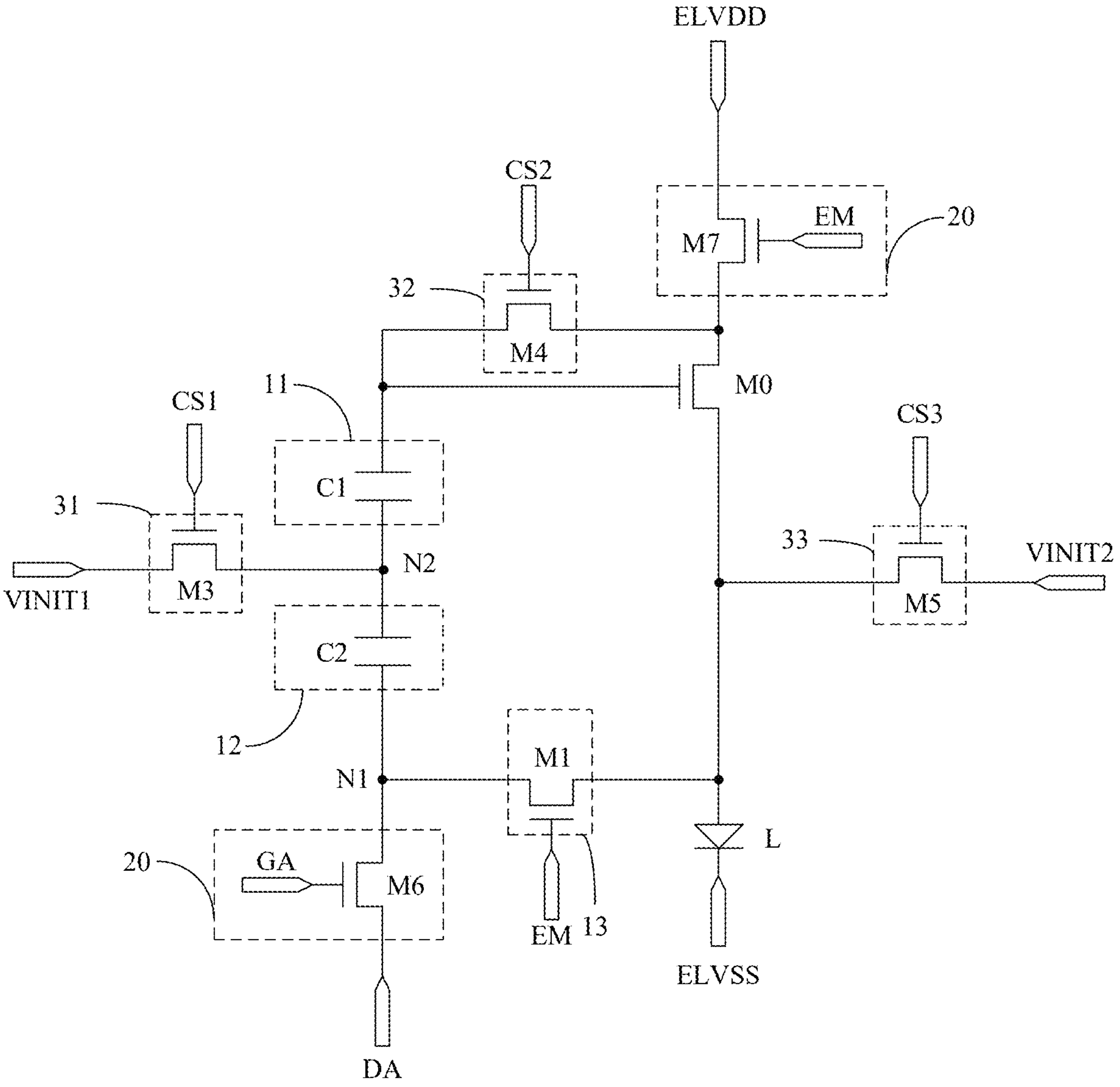
FIG. 3 is a specific schematic structural diagram of some pixel circuits according to an embodiment of the disclosure.

In the embodiment of the disclosure, as shown in FIG. 3, the second electrode of the drive transistor M0 is directly coupled to an anode of the light emitting device L, and a cathode of the light emitting device L is coupled to a second power end ELVSS. For example, the light emitting device L may be at least one of a micro light emitting diode (Micro LED), an organic light emitting diode (OLED), and a quantum dot light emitting diode (QLED). For example, the light emitting device L may include the anode, a light emitting layer and the cathode that are laminated. Further, the light emitting layer may further include a hole injection layer, a hole transport layer, an electron transport layer, an electron injection layer, or other film layers. In practical application, a specific structure of the light emitting device L may be designed and determined according to an actual application environment, which is not limited herein.

In some embodiments of the disclosure, as shown in FIG. 3, the first coupling sub-circuit 11 includes: a first capacitor C1. A first electrode plate of the first capacitor C1 is coupled to the gate electrode of the drive transistor M0. A second electrode plate of the first capacitor C1 is coupled to the second node N2.

In some embodiments of the disclosure, as shown in FIG. 3, the second coupling sub-circuit 12 includes: a second capacitor C2. A first electrode plate of the second capacitor C2 is coupled to the second node N2. A second electrode plate of the second capacitor C2 is coupled to the first node N1.

In some embodiments of the disclosure, as shown in FIG. 3, the turning-on control circuit 13 includes: a first transistor M1. A gate electrode of the first transistor M1 is coupled to the light emitting control signal end EM. A first electrode of the first transistor M1 is coupled to the first node N1. A second electrode of the first transistor M1 is coupled to the second electrode of the drive transistor M0.

For example, the first transistor M1 is turned on under control of an effective level of a light emitting control signal of the light emitting control signal end EM, and turned off under control of an ineffective level of the light emitting control signal. Optionally, if the first transistor M1 is an N-type transistor, the effective level and the ineffective level of the light emitting control signal are a high level and a low level respectively. Alternatively, if the first transistor M1 is a P-type transistor, the effective level and the ineffective level of the light emitting control signal are a low level and a high level respectively.

In some embodiments of the disclosure, as shown in FIG. 3, the first threshold compensation sub-circuit 31 includes: a third transistor M3. A gate electrode of the third transistor M3 is coupled to the first compensation control signal end CS1. A first electrode of the third transistor M3 is coupled to the second node N2. A second electrode of the third transistor M3 is coupled to the first initialization signal end VINIT1.

For example, the third transistor M3 is turned on under control of an effective level of a first compensation control signal of the first compensation control signal end CS1, and turned off under control of an ineffective level of the first compensation control signal. Optionally, if the third transistor M3 is an N-type transistor, the effective level and the ineffective level of the first compensation control signal are a high level and a low level respectively. Alternatively, if the third transistor M3 is a P-type transistor, the effective level and the ineffective level of the first compensation control signal are a low level and a high level respectively.

In some embodiments of the disclosure, as shown in FIG. 3, the second threshold compensation sub-circuit 32 includes: a fourth transistor M4. A gate electrode of the fourth transistor M4 is coupled to the second compensation control signal end CS2. A first electrode of the fourth transistor M4 is coupled to the gate electrode of the drive transistor M0. A second electrode of the fourth transistor M4 is coupled to the first electrode of the drive transistor M0.

For example, the fourth transistor M4 is turned on under control of an effective level of a second compensation control signal of the second compensation control signal end CS2, and turned off under control of an ineffective level of the second compensation control signal. Optionally, if the fourth transistor M4 is an N-type transistor, the effective level and the ineffective level of the second compensation control signal are a high level and a low level respectively. Alternatively, if the fourth transistor M4 is a P-type transistor, the effective level and the ineffective level of the second compensation control signal are a low level and a high level respectively.

In some embodiments of the disclosure, as shown in FIG. 3, the third threshold compensation sub-circuit 33 includes: a fifth transistor M5. A gate electrode of the fifth transistor M5 is coupled to the third compensation control signal end CS3. A first electrode of the fifth transistor M5 is coupled to the second initialization signal end VINIT2. A second electrode of the fifth transistor M5 is coupled to the second electrode of the drive transistor M0.

For example, the fifth transistor M5 is turned on under control of an effective level of a third compensation control signal of the third compensation control signal end CS3, and turned off under control of an ineffective level of the third compensation control signal. Optionally, if the fifth transistor M5 is an N-type transistor, the effective level and the ineffective level of the third compensation control signal are a high level and a low level respectively. Alternatively, if the fifth transistor M5 is a P-type transistor, the effective level and the ineffective level of the second compensation control signal are a low level and a high level respectively.

In some embodiments of the disclosure, as shown in FIG. 3, the signal writing circuit 20 includes: a sixth transistor M6 and a seventh transistor M7. A gate electrode of the sixth transistor M6 is coupled to the scanning signal end GA. A first electrode of the sixth transistor M6 is coupled to the data signal end DA. A second electrode of the sixth transistor M6 is coupled to the first node N1. A gate electrode of the seventh transistor M7 is coupled to the light emitting control signal end EM. A first electrode of the seventh transistor M7 is coupled to the first power end ELVDD. A second electrode of the seventh transistor M7 is coupled to the first electrode of the drive transistor M0.

For example, the sixth transistor M6 is turned on under control of an effective level of a scanning signal of the scanning signal end GA, and turned off under control of an ineffective level of the scanning signal. Optionally, if the sixth transistor M6 is an N-type transistor, the effective level and the ineffective level of the scanning signal are a high level and a low level respectively. Alternatively, if the sixth transistor M6 is a P-type transistor, the effective level and the ineffective level of the scanning signal are a low level and a high level respectively.

For example, the seventh transistor M7 is turned on under control of an effective level of the light emitting control signal of the light emitting control signal end EM, and turned off under control of an ineffective level of the light emitting control signal. Optionally, if the seventh transistor M7 is an N-type transistor, the effective level and the ineffective level of the light emitting control signal are a high level and a low level respectively. Alternatively, if the seventh transistor M7 is a P-type transistor, the effective level and the ineffective level of the light emitting control signal are a low level and a high level respectively.

For example, at least one of the first initialization signal end VINIT1 and the second initialization signal end VINIT2 may be the same signal end as the second power end. In this way, a number of signal wires can be reduced, and wiring difficulty can be reduced.

For example, a first electrode and a second electrode of the transistor may be used as a source electrode and a drain electrode of the transistor respectively; and alternatively, a first electrode and a second electrode may be used as a drain electrode and a source electrode respectively, which are not limited herein.

Generally, a transistor with an active layer of low temperature poly-silicon (LTPS) has high mobility and may be made thinner and smaller, and lower in power consumption. During specific implementation, a material of the active layer of at least one transistor may be set as low temperature poly-silicon. In this way, the transistor may be set as an LTPS transistor, such that the pixel circuit can have high mobility, be thinner and smaller, and be lower in power consumption.

Generally, a transistor with an active layer of a metal oxide semiconductor material has a smaller leakage current. In order to reduce the leakage current, in some embodiments of the disclosure, a material of an active layer of at least one transistor may also include a metal oxide semiconductor material, such as indium gallium zinc oxide (IGZO), and clearly, may also be another metal oxide semiconductor material, which is not limited herein. In this way, the transistor may be set as an oxide thin film transistor, such that a leakage current of the pixel circuit can be reduced.

For example, all transistors may be set as LTPS-type transistors. Alternatively, all transistors may be set as oxide transistors. Alternatively, some transistors may be set as oxide transistors, and the other transistors may be set as LTPS-type transistors. For example, the first transistor M1, the third transistor M3 and the fourth transistor M4 may be set as oxide transistors, and the other transistors may be set as LTPS-type transistors.

Figure 5A:
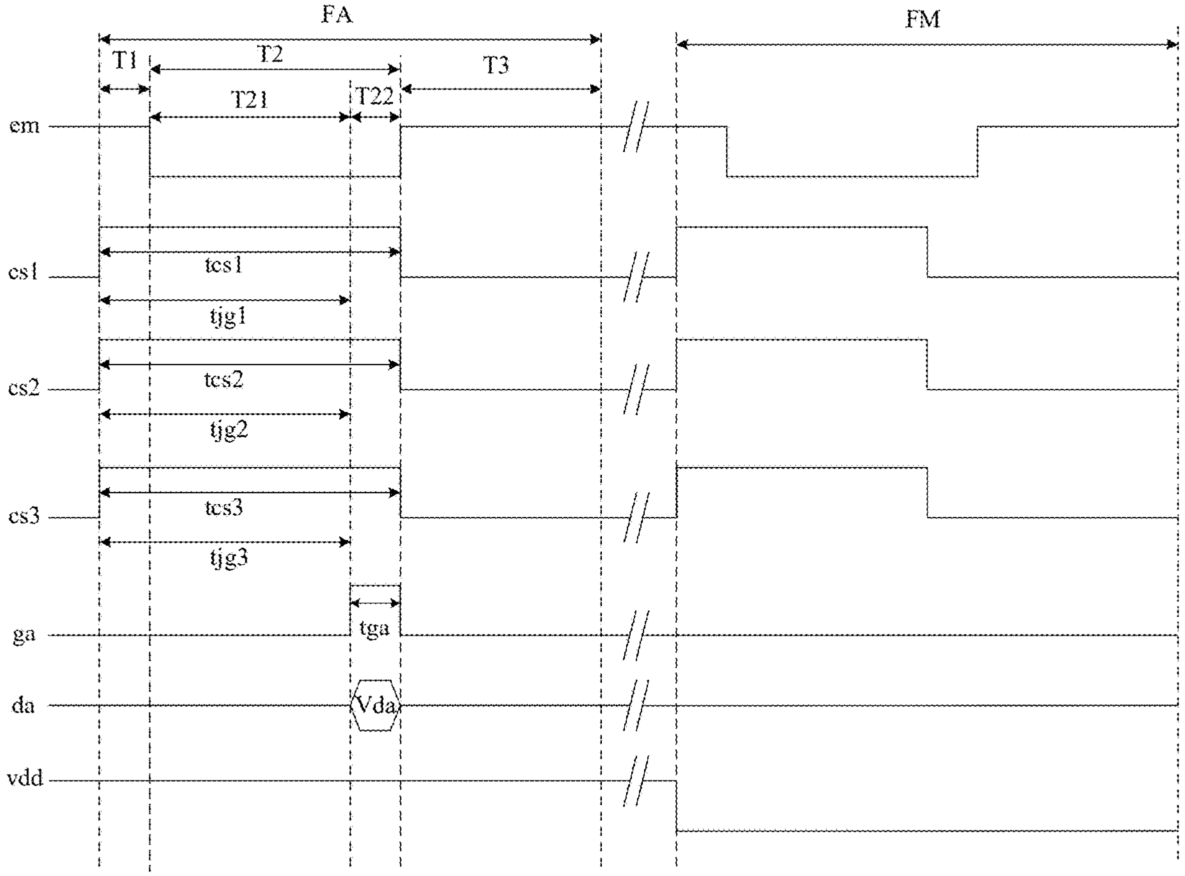
FIG. 5A is a signal sequence diagram of some pixel circuits according to an embodiment of the disclosure.
Figure 5B:
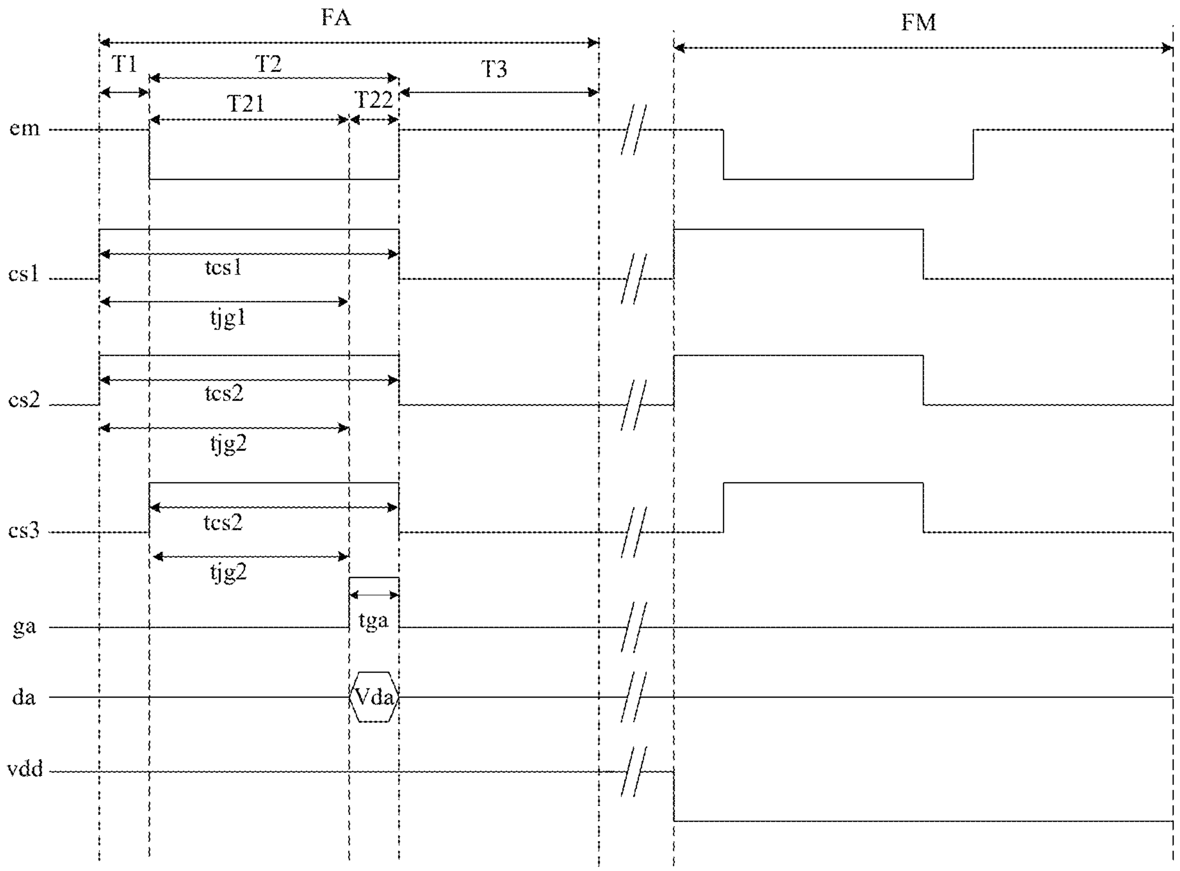
FIG. 5B is a signal sequence diagram of some other pixel circuits according to an embodiment of the disclosure.

In some embodiments of the disclosure, in one display frame, maintenance duration of an effective level of the first compensation control signal end CS1 may be longer than that of an effective level of the scanning signal end GA. For example, as shown in FIGS. 5A and 5B, with the effective level as a high level as an example, cs1 represents the first compensation control signal of the first compensation control signal end CS1, and ga represents the scanning signal of the scanning signal end GA. In one display frame, maintenance duration tcs1 of the high level of the first compensation control signal cs1 is longer than maintenance duration tga of the high level of the scanning signal ga. In this way, duration of turning on the fourth transistor M4 may be longer than duration of turning on the sixth transistor M6.

In some embodiments of the disclosure, in one display frame, an effective level of the first compensation control signal end CS1 may have overlapping duration with an effective level of the scanning signal end GA. For example, as shown in FIGS. 5A and 5B, with the effective level as a high level as an example, in one display frame, the high level of the first compensation control signal cs1 has overlapping duration with the high level of the scanning signal ga. In this way, the fourth transistor M4 and the sixth transistor M6 may be simultaneously turned on in the overlapping duration.

In some embodiments of the disclosure, in one display frame, a start moment of an effective level of the first compensation control signal end CS1 may be located before that of an effective level of the scanning signal end GA; and an end moment of the effective level of the first compensation control signal end CS1 may be the same as that of the effective level of the scanning signal end GA. For example, as shown in FIGS. 5A and 5B, with the effective level as a high level as an example, in one display frame, a start moment of the high level of the first compensation control signal cs1 is located before that of the high level of the scanning signal ga; and an end moment of the high level of the first compensation control signal cs1 is the same as that of the high level of the scanning signal ga. In this way, the fourth transistor M4 may be turned on, and the sixth transistor M6 may be turned on after a period of time. Moreover, the fourth transistor M4 and the sixth transistor M6 may be simultaneously turned off.

In some other embodiments of the disclosure, in one display frame, a start moment of an effective level of the first compensation control signal end CS1 may be located before that of an effective level of the scanning signal end GA; and an end moment of the effective level of the first compensation control signal end CS1 may be located after that of the effective level of the scanning signal end GA. For example, with the effective level as a high level as an example, in one display frame, a start moment of the high level of the first compensation control signal cs1 is located before that of the high level of the scanning signal ga; and an end moment of the high level of the first compensation control signal cs1 is located after that of the high level of the scanning signal ga. In this way, the fourth transistor M4 may be turned on, and the sixth transistor M6 may be turned on after a period of time. Moreover, the sixth transistor M6 may be turned off, and then the fourth transistor M4 may be turned off after a period of time.

In some other embodiments of the disclosure, in one display frame, first interval duration exists between a start moment of an effective level of the first compensation control signal end CS1 and a start moment of an effective level of the scanning signal end GA, and the first interval duration is longer than maintenance duration of an effective level of the scanning signal end GA. For example, as shown in FIGS. 5A and 5B, with the effective level as a high level as an example, in one display frame, first interval duration tjg1 exists between a start moment of the high level of the first compensation control signal cs1 and a start moment of the high level of the scanning signal ga, and the first interval duration tjg1 is longer than maintenance duration tga of the high level of the scanning signal ga.

In some embodiments of the disclosure, in one display frame, maintenance duration of an effective level of the second compensation control signal end CS2 may be longer than that of an effective level of the scanning signal end GA. For example, as shown in FIGS. 5A and 5B, with the effective level as a high level as an example, cs2 represents the second compensation control signal. In one display frame, maintenance duration tcs2 of the high level of the second compensation control signal cs2 is longer than maintenance duration tga of the high level of the scanning signal ga. In this way, duration of turning on the fourth transistor M4 may be longer than duration of turning on the sixth transistor M6.

In some embodiments of the disclosure, in one display frame, an effective level of the second compensation control signal end CS2 may have overlapping duration with an effective level of the scanning signal end GA. For example, as shown in FIGS. 5A and 5B, with the effective level as a high level as an example, in one display frame, the high level of the second compensation control signal cs2 has overlapping duration with the high level of the scanning signal ga. In this way, the fourth transistor M4 and the sixth transistor M6 may be simultaneously turned on in the overlapping duration.

In some embodiments of the disclosure, in one display frame, a start moment of an effective level of the second compensation control signal end CS2 may be located before that of an effective level of the scanning signal end GA; and an end moment of the effective level of the second compensation control signal end CS2 may be the same as that of the effective level of the scanning signal end GA. For example, as shown in FIGS. 5A and 5B, with the effective level as a high level as an example, in one display frame, a start moment of the high level of the second compensation control signal cs2 is located before that of the high level of the scanning signal ga; and an end moment of the high level of the second compensation control signal cs2 is the same as that of the high level of the scanning signal ga. In this way, the fourth transistor M4 may be turned on, and the sixth transistor M6 may be turned on after a period of time. Moreover, the fourth transistor M4 and the sixth transistor M6 may be simultaneously turned off.

In some other embodiments of the disclosure, in one display frame, a start moment of an effective level of the second compensation control signal end CS2 may be located before that of an effective level of the scanning signal end GA; and an end moment of the effective level of the second compensation control signal end CS2 may be located after that of the effective level of the scanning signal end GA. For example, with the effective level as a high level as an example, in one display frame, a start moment of the high level of the second compensation control signal cs2 is located before that of the high level of the scanning signal ga; and an end moment of the high level of the second compensation control signal cs2 is located after that of the high level of the scanning signal ga. In this way, the fourth transistor M4 may be turned on, and the sixth transistor M6 may be turned on after a period of time. Moreover, the sixth transistor M6 may be turned off, and then the fourth transistor M4 may be turned off after a period of time.

In some other embodiments of the disclosure, in one display frame, second interval duration exists between a start moment of an effective level of the second compensation control signal end CS2 and a start moment of an effective level of the scanning signal end GA, and the second interval duration is longer than maintenance duration of an effective level of the scanning signal end GA. For example, as shown in FIGS. 5A and 5B, with the effective level as a high level as an example, in one display frame, second interval duration tjg2 exists between a start moment of the high level of the second compensation control signal cs2 and a start moment of the high level of the scanning signal ga, and the second interval duration tjg2 is longer than maintenance duration tga of the high level of the scanning signal ga.

In some embodiments of the disclosure, in one display frame, maintenance duration of an effective level of the third compensation control signal end CS3 may be longer than that of an effective level of the scanning signal end GA. For example, as shown in FIGS. 5A and 5B, with the effective level as a high level as an example, cs3 represents the third compensation control signal of the third compensation control signal end CS3. In one display frame, maintenance duration tcs3 of the high level of the third compensation control signal cs3 is longer than maintenance duration tga of the high level of the scanning signal ga. In this way, duration of turning on the fourth transistor M4 may be longer than duration of turning on the sixth transistor M6.

In some embodiments of the disclosure, in one display frame, an effective level of the third compensation control signal end CS3 may have overlapping duration with an effective level of the scanning signal end GA. For example, as shown in FIGS. 5A and 5B, with the effective level as a high level as an example, in one display frame, the high level of the third compensation control signal cs3 has overlapping duration with the high level of the scanning signal ga. In this way, the fourth transistor M4 and the sixth transistor M6 may be simultaneously turned on in the overlapping duration.

In some embodiments of the disclosure, in one display frame, a start moment of an effective level of the third compensation control signal end CS3 may be located before that of an effective level of the scanning signal end GA; and an end moment of the effective level of the third compensation control signal end CS3 may be the same as that of the effective level of the scanning signal end GA. For example, as shown in FIGS. 5A and 5B, with the effective level as a high level as an example, in one display frame, a start moment of the high level of the third compensation control signal cs3 is located before that of the high level of the scanning signal ga; and an end moment of the high level of the third compensation control signal cs3 is the same as that of the high level of the scanning signal ga. In this way, the fourth transistor M4 may be turned on, and the sixth transistor M6 may be turned on after a period of time. Moreover, the fourth transistor M4 and the sixth transistor M6 may be simultaneously turned off.

In some other embodiments of the disclosure, in one display frame, a start moment of an effective level of the third compensation control signal end CS3 may be located before that of an effective level of the scanning signal end GA; and an end moment of the effective level of the third compensation control signal end CS3 may be located after that of the effective level of the scanning signal end GA. For example, with the effective level as a high level as an example, in one display frame, a start moment of the high level of the third compensation control signal cs3 is located before that of the high level of the scanning signal ga; and an end moment of the high level of the third compensation control signal cs3 is located after that of the high level of the scanning signal ga. In this way, the fourth transistor M4 may be turned on, and the sixth transistor M6 may be turned on after a period of time. Moreover, the sixth transistor M6 may be turned off, and then the fourth transistor M4 may be turned off after a period of time.

In some other embodiments of the disclosure, in one display frame, first interval duration exists between a start moment of an effective level of the third compensation control signal end CS3 and a start moment of an effective level of the scanning signal end GA, and the first interval duration is longer than maintenance duration of an effective level of the scanning signal end GA. For example, as shown in FIGS. 5A and 5B, with the effective level as a high level as an example, in one display frame, first interval duration tjg3 exists between a start moment of the high level of the third compensation control signal cs3 and a start moment of the high level of the scanning signal ga, and the first interval duration tjg3 is longer than maintenance duration tga of the high level of the scanning signal ga.

For example, as shown in FIG. 5A, the first compensation control signal cs1 and the second compensation control signal cs2 may be the same in one display frame. For example, in one display frame, maintenance duration tcs2 of a high level of the second compensation control signal cs2 and maintenance duration tcs1 of a high level of the first compensation control signal cs1 are the same and appear simultaneously.

For example, as shown in FIG. 5A, the first compensation control signal cs1 and the third compensation control signal cs3 may be the same in one display frame. For example, in one display frame, maintenance duration tcs3 of a high level of the third compensation control signal cs3 and maintenance duration tcs1 of a high level of the first compensation control signal cs1 are the same and appear simultaneously.

For example, as shown in FIG. 5B, the first compensation control signal cs1 and the third compensation control signal cs3 may also be different in one display frame. For example, in one display frame, maintenance duration tcs3 of a high level of the third compensation control signal cs3 is shorter than maintenance duration tcs1 of a high level of the first compensation control signal cs1.

A drive method for the pixel circuit according to an embodiment of the disclosure involves: a threshold compensation and data writing stage T2 and a light emitting stage T3 in each of a plurality of consecutive display frames. Optionally, before the threshold compensation and data writing stage T2, the drive method may further involve an initialization stage T1.

Figure 4:
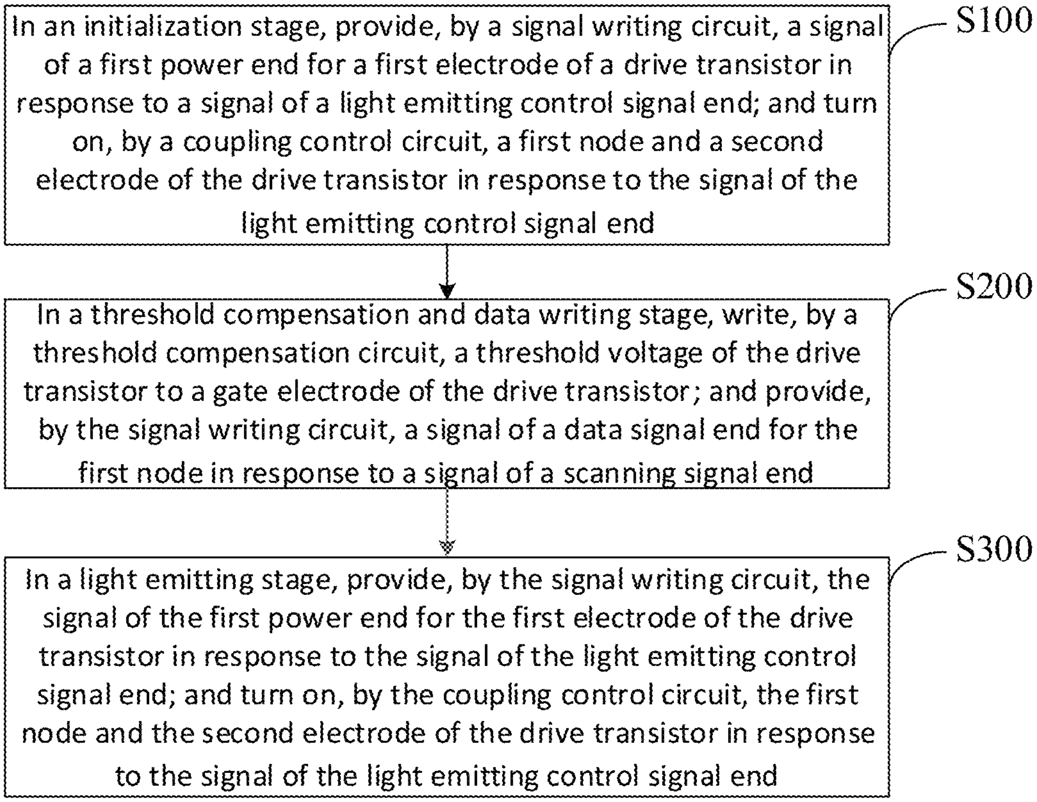
FIG. 4 is a flow diagram of a drive method for some pixel circuits according to an embodiment of the disclosure.

For example, as shown in FIG. 4, a working process of the pixel circuit according to the embodiment of the disclosure in one display frame includes the following steps.

S100, in the initialization stage T1, a signal writing circuit provides a signal of a first power end for a first electrode of a drive transistor in response to a signal of a light emitting control signal end; a coupling control circuit turns on a first node and a second electrode of the drive transistor in response to the signal of the light emitting control signal end; and the coupling control circuit stabilizes voltages of the first node and a gate electrode of the drive transistor.

S200, in the threshold compensation and data writing stage T2, a threshold compensation circuit writes a threshold voltage of the drive transistor to the gate electrode of the drive transistor; the signal writing circuit provides a signal of a data signal end DA for the first node in response to a signal of a scanning signal end; and the coupling control circuit stabilizes the voltages of the first node and the gate electrode of the drive transistor.

S300, in the light emitting stage T3, the signal writing circuit provides the signal of the first power end for the first electrode of the drive transistor in response to the signal of the light emitting control signal end; the coupling control circuit turns on the first node and the second electrode of the drive transistor in response to the signal of the light emitting control signal end; the coupling control circuit stabilizes the voltages of the first node and the gate electrode of the drive transistor; and the drive transistor generates a drive current for driving a light emitting device to emit light according to a data voltage, so as to drive the light emitting device to emit light.

In an embodiment of the disclosure, in the initialization stage T1, the drive method further includes the following step: the threshold compensation circuit initializes the first node, a second node, and the gate electrode, the first electrode and the second electrode of the drive transistor.

In an embodiment of the disclosure, in a display frame, the first power end may be configured to load a constant high voltage Vdd. The high voltage Vdd is generally a positive value. In addition, a second power end ELVSS may load a constant low voltage Vss. The low voltage Vss may generally be a ground voltage or a negative value. In practical application, specific values of the high voltage Vdd and the low voltage Vss may be determined according to an actual application environment, which are not limited herein.

In some examples, with a pixel drive circuit shown in FIG. 3 as an example, in combination with a signal sequence diagram shown in FIG. 5A, a working process of the pixel circuit according to the embodiment of the disclosure will be described below.

In the embodiment of the disclosure, as shown in FIG. 5A, em represents a light emitting control signal of the light emitting control signal end EM, cs1 represents a first compensation control signal of a first compensation control signal end CS1, cs2 represents a second compensation control signal of a second compensation control signal end CS2, cs3 represents a third compensation control signal of a third compensation control signal end CS3, ga represents a scanning signal of the scanning signal end GA, da represents a data voltage signal of the data signal end DA, and vdd represents the signal of the first power end ELVDD.

In addition, an initialization stage T1, a threshold compensation and data writing stage T2 and a light emitting stage T3 in one display frame FA are selected.

In the initialization stage T1, a third transistor M3 is turned on under control of a high level of the first compensation control signal, a fourth transistor M4 is turned on under control of a high level of the second compensation control signal, a fifth transistor M5 is turned on under control of a high level of the third compensation control signal, a sixth transistor M6 is turned off under control of a low level of the scanning signal, and a first transistor M1 and a seventh transistor M7 are turned on under control of a high level of the light emitting control signal. The seventh transistor M7 turned on inputs a voltage of the first power end ELVDD to the first electrode of the drive transistor M0, and initializes the first electrode of the drive transistor M0. The fourth transistor M4 turned on turns on the gate electrode and the first electrode of the drive transistor M0, such that the voltage VM0*g* of the gate electrode of the drive transistor M0 is equal to the voltage Vdd of the first power end ELVDD, that is, VM0*g*=Vdd. The gate electrode of the drive transistor M0 is initialized. The fifth transistor M5 turned on provides a second initialization signal of a second initialization signal end VINIT2 for the second electrode of the drive transistor M0, such that a voltage VM0*s* of the second electrode of the drive transistor M0 is equal to a voltage Vint2 of the second initialization signal, that is, VM0*s*=Vint2. The second electrode of the drive transistor M0 and an anode of the light emitting device L are initialized. The first transistor M1 turned on turns on the second electrode of the drive transistor M0 and the first node N1, such that the voltage VN1 of the first node N1 is equal to the voltage Vint2 of the second initialization signal, that is, VN1=Vint2. The first node N1 is initialized. The third transistor M3 turned on provides a first initialization signal of a first initialization signal end VINIT1 for the second node N2, such that a voltage VN2 of the second node N2 is equal to a voltage Vint1 of the first initialization signal, that is, VN2=Vint1. The second node N2 is initialized.

In stage T21 of the threshold compensation and data writing stage T2, the third transistor M3 is turned on under control of the high level of the first compensation control signal, the fourth transistor M4 is turned on under control of the high level of the second compensation control signal, the fifth transistor M5 is turned on under control of the high level of the third compensation control signal, the sixth transistor M6 is turned off under control of the low level of the scanning signal, and the first transistor M1 and the seventh transistor M7 are turned off under control of a low level of the light emitting control signal. The third transistor M3 turned on provides the first initialization signal of the first initialization signal end VINIT1 for the second node N2, such that VN2=Vint1. The fifth transistor M5 turned on provides the second initialization signal of the second initialization signal end VINIT2 for the second electrode of the drive transistor M0, such that VM0*s*=Vint2. The fourth transistor M4 turned on turns on the gate electrode and the first electrode of the drive transistor M0, such that the drive transistor M0 forms a diode connection mode. The voltage of the gate electrode of the drive transistor M0 is discharged via a path from the fourth transistor M4, the drive transistor M0 and the fifth transistor M5 to the second initialization signal end VINIT2, such that the voltage of the gate electrode of the drive transistor M0 is constantly reduced from Vdd.

In stage T22 of the threshold compensation and data writing stage T2, the third transistor M3 is turned on under control of the high level of the first compensation control signal, the fourth transistor M4 is turned on under control of the high level of the second compensation control signal, the fifth transistor M5 is turned on under control of the high level of the third compensation control signal, the sixth transistor M6 is turned on under control of a high level of the scanning signal, and the first transistor M1 and the seventh transistor M7 are turned off under control of the low level of the light emitting control signal. The third transistor M3 turned on provides the first initialization signal of the first initialization signal end VINIT1 for the second node N2, such that VN2=Vint1. The fifth transistor M5 turned on provides the second initialization signal of the second initialization signal end VINIT2 for the second electrode of the drive transistor M0, such that VM0*s*=Vint2. The fourth transistor M4 turned on turns on the gate electrode and the first electrode of the drive transistor M0, such that the drive transistor M0 forms a diode connection mode. The voltage of the gate electrode of the drive transistor M0 is continuously discharged via the path from the fourth transistor M4, the drive transistor M0 and the fifth transistor M5 to the second initialization signal end VINIT2 until VM0g=Vint2+Vth. In this case, compensation of the threshold voltage is completed, and the drive transistor M0 is turned off. The sixth transistor M6 turned on inputs the data voltage Vda of the data signal end DA to the first node N1, such that VN1=Vda.

In the light emitting stage T3, the third transistor M3 is turned off under control of a low level of the first compensation control signal, the fourth transistor M4 is turned off under control of a low level of the second compensation control signal, the fifth transistor M5 is turned off under control of a low level of the third compensation control signal, the sixth transistor M6 is turned off under control of the low level of the scanning signal, and the first transistor M1 and the seventh transistor M7 are turned on under control of the high level of the light emitting control signal. A first capacitor C1 and a second capacitor C2 are connected in series to form a new capacitor, and the voltage of the gate electrode of the drive transistor M0 is in a floating state. Since the seventh transistor M7 is turned on, the high voltage of the first power end ELVDD is input to the first electrode of the drive transistor M0, and the drive transistor M0 generates a drive current. The drive current flows through the drive transistor M0 so as to charge the anode of the light emitting device L, such that VM0s gradually rises to Vss+Voled. Voled is a voltage difference between a cathode and the anode of the light emitting device L during light emission. Due to a coupling effect of the first capacitor C1 and the second capacitor C2, variations of VM0s and VN2 may be coupled to the gate electrode of the drive transistor M0. If a voltage variation of the gate electrode of the drive transistor M0 is Vss+Voled−Vda, VM0g=Vint2+Vth+Vss+Voled−Vda. Therefore, if a voltage difference Vgs between the gate electrode and a source electrode of the drive transistor M0 is Vint2+Vth-Vda, the drive transistor M0 works in a saturation zone, and a drive current I generated may be expressed as: $I=K*(Vgs-Vth)^2=K*(Vint2-Vda)^2$. $K=1/2*\mu*Cox*W/L$, where $\mu$ denotes a mobility ratio of the drive transistor M0, Cox denotes capacitance of a gate insulating layer, and W/L denotes a channel width-length ratio of the drive transistor M0.

It may be seen from the above description that since the drive current I is not related to the threshold voltage Vth of the drive transistor M0, a second power voltage Vss of the second power end ELVSS and the Voled of the light emitting device L, the pixel circuit can solve problems of uneven compensation of the threshold voltage of the drive transistor M0, voltage drop of the second power voltage of the second power end ELVSS and uneven display caused by aging of the light emitting device L, so as to improve a display effect.

Moreover, in the stage T21, a process of compensating for the threshold voltage is implemented. In the stage T22, not only a process of writing the data voltage is implemented, but also the process of compensating for the threshold voltage is can be continuously implemented, and the data voltage is coupled to the gate electrode of the drive transistor M0 on the basis of a coupling effect of a capacitor. In the light emitting stage T3, the first capacitor C1 and the second capacitor C2 are connected in series to form a new capacitor, which is conducive to capacitor bootstrap.

In addition, since a path of compensating for the threshold voltage of the drive transistor M0 is different from a path of writing the data voltage, and compensation for the threshold voltage of the drive transistor M0 and writing of the data voltage are further conducted in a time-sharing manner, threshold voltage compensation of the drive transistor M0 and data voltage writing can be conducted separately. In this way, high-frequency driving can be implemented, and threshold voltage drift of the drive transistor M0 can be prevented from influencing light emission of the light emitting device L.

In addition, since the process of compensating for the threshold voltage of the drive transistor M0 and the process of writing the data voltage are separated, the process of compensating for the threshold voltage may be conducted for a long time, such that the threshold voltage of the drive transistor M0 can be better compensated for, and a drive speed can be increased, such as 120 Hz, 180 Hz, and 240 Hz, which is conducive to improvement in an effect of scenes in fields such as games; and precision of the drive current can be improved, display quality can be enhanced, and further light emitting stability and a display effect of the display panel can be improved.

Further, the drive method further includes the following step: a black frame is inserted between two adjacent display frames of at least some display frames in a plurality of display frames. In the black frame inserted, the signal writing circuit 20 provides the signal of the first power end ELVDD for the first electrode of the drive transistor M0 in response to the signal of the light emitting control signal end EM; and the threshold compensation circuit 30 initializes the first node N1 and the gate electrode, the first electrode and the second electrode of the drive transistor M0. The voltage of the first power end ELVDD is a low voltage. For example, as shown in FIG. 5A, FM represents the black frame inserted. In the black frame inserted FM, a third transistor M3 is turned on under control of a high level of the first compensation control signal, a fourth transistor M4 is turned on under control of a high level of the second compensation control signal, a fifth transistor M5 is turned on under control of a high level of the third compensation control signal, a sixth transistor M6 is turned off under control of a low level of the scanning signal, and a first transistor M1 and a seventh transistor M7 are turned on under control of a high level of the light emitting control signal. The seventh transistor M7 turned on inputs a low voltage of the first power end ELVDD to the first electrode of the drive transistor M0, and initializes the first electrode of the drive transistor M0. The fourth transistor M4 turned on turns on the gate electrode and the first electrode of the drive transistor M0, such that the voltage VM0g of the gate electrode of the drive transistor M0 is equal to the low voltage Vdd' of the first power end ELVDD, that is, VM0g=Vdd'. The gate electrode of the drive transistor M0 is initialized. The fifth transistor M5 turned on provides a second initialization signal of a second initialization signal end VINIT2 for the second electrode of the drive transistor M0, such that a voltage VM0s of the second electrode of the drive transistor M0 is equal to a voltage Vint2 of the second initialization signal, that is, VM0s=Vint2. The second electrode of the drive transistor M0 and an anode of the light emitting device L are initialized. The first transistor M1 turned on turns on the second electrode of the drive transistor M0 and the first node N1, such that the voltage VN1 of the first node N1 is equal to the voltage Vint2 of the second initialization signal, that is, VN1=Vint2. The first node N1 is initialized. The third transistor M3 turned on provides a first initialization signal of a first initialization signal end VINIT1 for the second node N2, such that a voltage VN2 of the second node N2 is equal to a voltage Vint1 of the first initialization signal, that is, VN2=Vint1. The second node N2 is initialized.

The low voltage Vdd' of the first power end ELVDD may control the drive transistor M0 to be turned off, such that a working process of threshold compensation is not conducted. Moreover, in the black frame inserted, the scanning signal outputs no high level, and no data voltage needs to be output, such that power consumption can be reduced.

In some other examples, with a pixel drive circuit shown in FIG. 3 as an example, in combination with a signal sequence diagram shown in FIG. 5B, a working process of the pixel circuit according to the embodiment of the disclosure will be described below.

In the embodiment of the disclosure, as shown in FIG. 5B, em represents a light emitting control signal of the light emitting control signal end EM, cs1 represents a first compensation control signal of a first compensation control signal end CS1, cs2 represents a second compensation control signal of a second compensation control signal end CS2, cs3 represents a third compensation control signal of a third compensation control signal end CS3, ga represents a scanning signal of the scanning signal end GA, da represents a data voltage signal of the data signal end DA, and vdd represents the signal of the first power end ELVDD. In addition, an initialization stage T1, a threshold compensation and data writing stage T2 and a light emitting stage T3 in one display frame FA are selected. In the initialization stage T1, the fifth transistor M5 is turned off under control of a low level of the second compensation control signal. Reference may be made to the above description for working processes of the other transistors. In addition, reference may be made to the above description for the initialization stage T1, the threshold compensation and data writing stage T2 and the light emitting stage T3, which will not be repeated herein.

Figure 6:
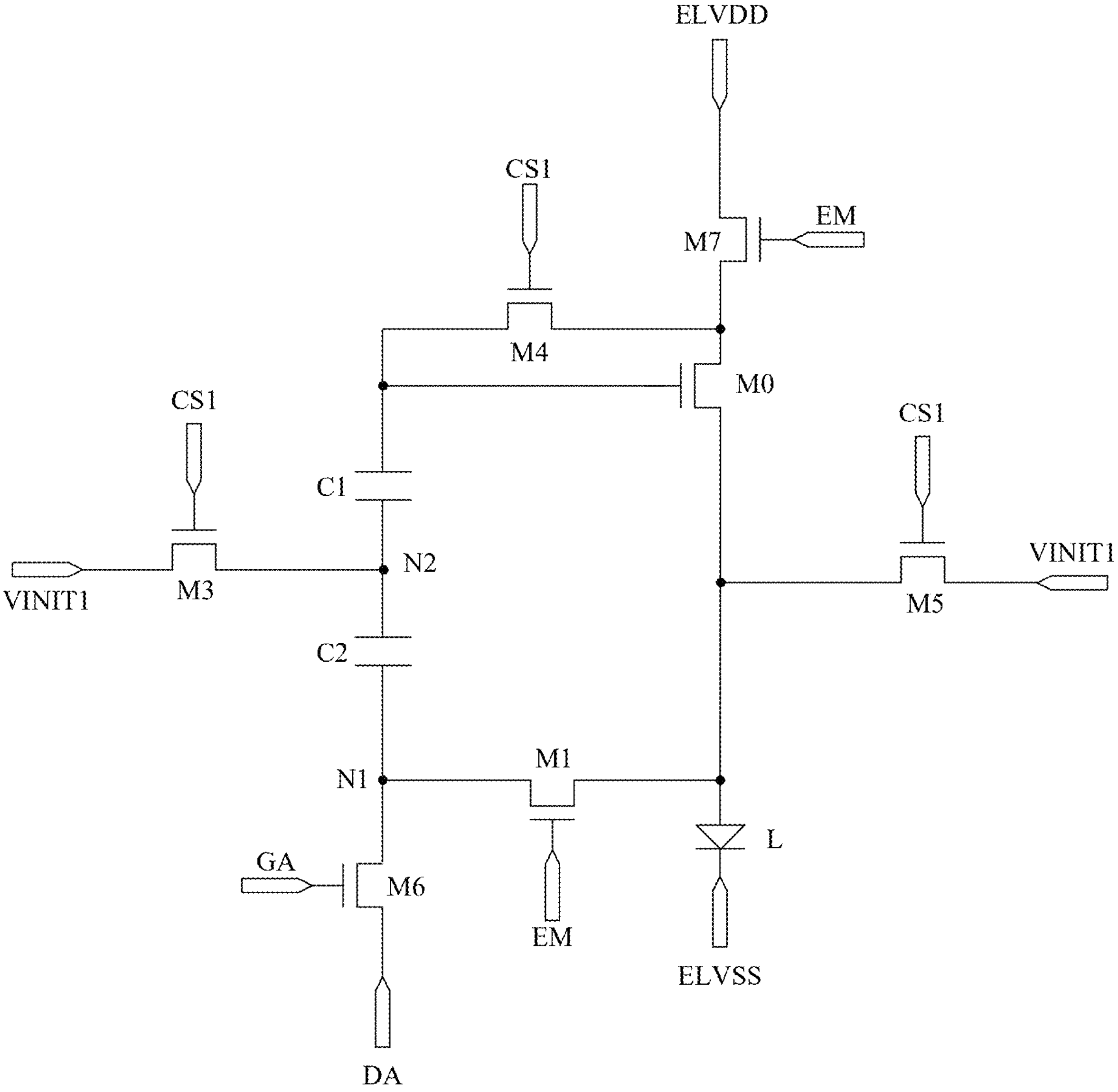
FIG. 6 is a specific schematic structural diagram of some other pixel circuits according to an embodiment of the disclosure.

An embodiment of the disclosure provides some other schematic structural diagrams of the pixel circuit. As shown in FIG. 6, implementations in the above embodiments are modified. Only differences between the embodiment and the above embodiments will be described below, and similarities will not be repeated herein.

In the embodiment of the disclosure, the first compensation control signal end CS1 and the second compensation control signal end CS2 may be the same signal end. For example, as shown in FIG. 6, a gate electrode of the fourth transistor M4 is coupled to the first compensation control signal end CS1. In this way, a number of signal wires can be reduced, and wiring difficulty can be reduced.

In the embodiment of the disclosure, the first compensation control signal end CS1 and the third compensation control signal end CS3 may be the same signal end. For example, as shown in FIG. 6, a gate electrode of the fifth transistor M5 is coupled to the first compensation control signal end CS1. In this way, a number of signal wires can be reduced, and wiring difficulty can be reduced.

In the embodiment of the disclosure, the first initialization signal end VINIT1 and the second initialization signal end VINIT2 may be the same signal end. For example, as shown in FIG. 6, a first electrode of the fifth transistor M5 is coupled to the first initialization signal end VINIT1. In this way, a number of signal wires can be reduced, and wiring difficulty can be reduced.

A signal sequence diagram corresponding to the pixel circuit shown in FIG. 6 may be as shown in FIG. 5A. In addition, reference may be made to the description of the above embodiment for a specific working process of the pixel circuit shown in FIG. 6 in combination with the signal sequence diagram shown in FIG. 5A, which will not be repeated herein.

Figure 7:
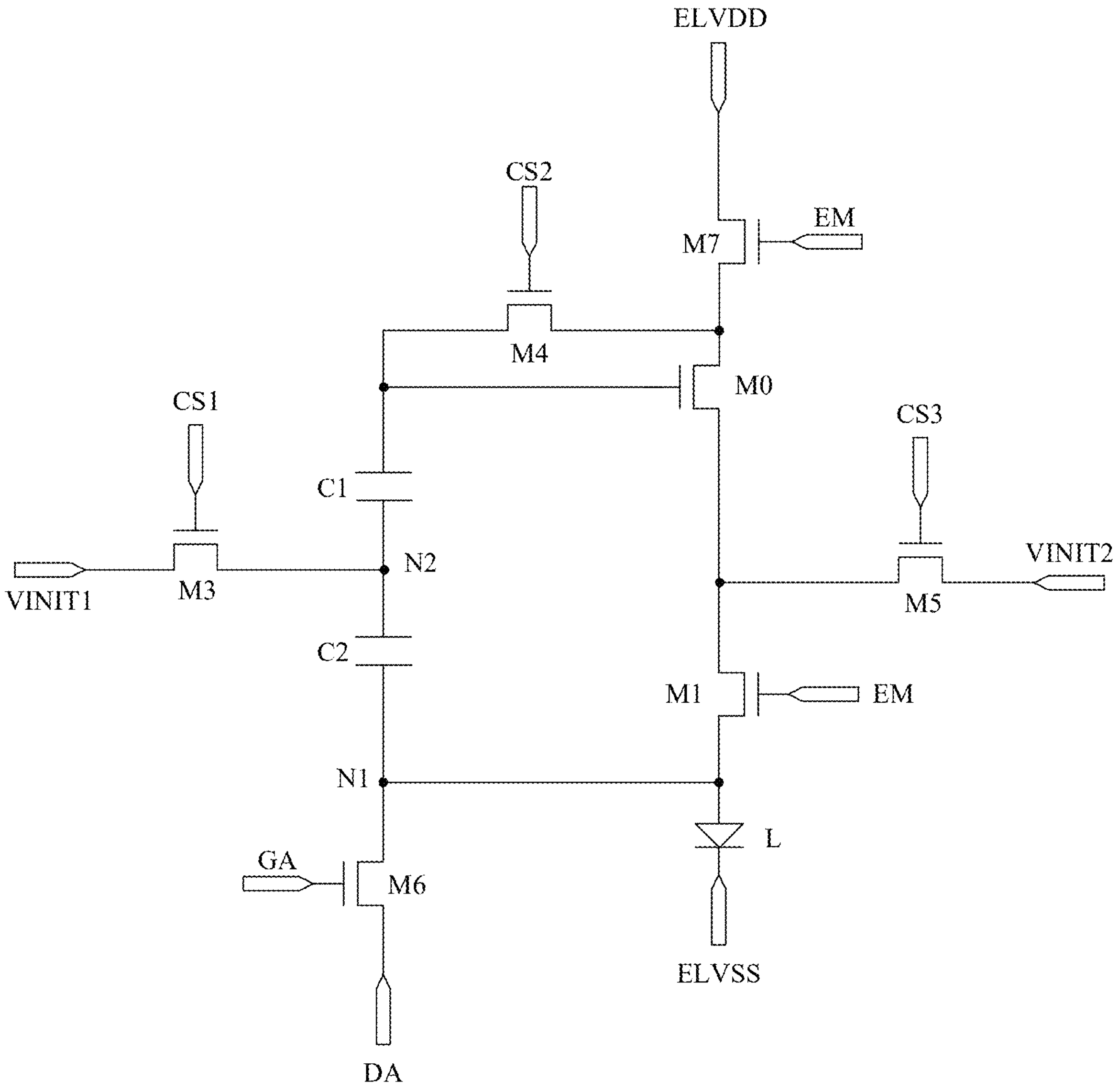
FIG. 7 is a specific schematic structural diagram of yet some other pixel circuits according to an embodiment of the disclosure.

An embodiment of the disclosure provides some other schematic structural diagrams of the pixel circuit. As shown in FIG. 7, implementations in the above embodiments are modified. Only differences between the embodiment and the above embodiments will be described below, and similarities will not be repeated herein.

In the embodiment of the disclosure, as shown in FIG. 7, the second electrode of the drive transistor M0 is connected to the light emitting device L by means of the first transistor M1, and the anode of the light emitting device L is coupled to the first node N1.

In some examples, with a pixel drive circuit shown in FIG. 7 as an example, in combination with a signal sequence diagram shown in FIG. 5A, a working process of the pixel circuit according to the embodiment of the disclosure will be described below.

In the initialization stage T1, a third transistor M3 is turned on under control of a high level of the first compensation control signal, a fourth transistor M4 is turned on under control of a high level of the second compensation control signal, a fifth transistor M5 is turned on under control of a high level of the third compensation control signal, a sixth transistor M6 is turned off under control of a low level of the scanning signal, and a first transistor M1 and a seventh transistor M7 are turned on under control of a high level of the light emitting control signal. The seventh transistor M7 turned on inputs a voltage of a first power end ELVDD to a first electrode of a drive transistor M0, and initializes the first electrode of the drive transistor M0. The fourth transistor M4 turned on turns on a gate electrode and the first electrode of the drive transistor M0, such that a voltage VM0g of the gate electrode of the drive transistor M0 is equal to the voltage Vdd of the first power end ELVDD, that is, VM0g=Vdd. The gate electrode of the drive transistor M0 is initialized. The fifth transistor M5 turned on provides a second initialization signal of a second initialization signal end VINIT2 for a second electrode of the drive transistor M0, such that a voltage VM0s of the second electrode of the drive transistor M0 is equal to a voltage Vint2 of the second initialization signal, that is, VM0s=Vint2. The second electrode of the drive transistor M0 is initialized. The first transistor M1 turned on turns on the second electrode of the drive transistor M0 and a first node N1, such that a voltage VN1 of the first node N1 is equal to the voltage Vint2 of the second initialization signal, that is, VN1=Vint2. The first node N1 and an anode of a light emitting device L are initialized. The third transistor M3 turned on provides a first initialization signal of a first initialization signal end VINIT1 for a second node N2, such that a voltage VN2 of the second node N2 is equal to a voltage Vint1 of the first initialization signal, that is, VN2=Vint1. The second node N2 is initialized.

In stage T21 of the threshold compensation and data writing stage T2, the third transistor M3 is turned on under control of the high level of the first compensation control signal, the fourth transistor M4 is turned on under control of the high level of the second compensation control signal, the fifth transistor M5 is turned on under control of the high level of the third compensation control signal, the sixth transistor M6 is turned off under control of the low level of the scanning signal, and the first transistor M1 and the seventh transistor M7 are turned off under control of a low level of the light emitting control signal. The third transistor M3 turned on provides the first initialization signal of the first initialization signal end VINIT1 for the second node N2, such that VN2=Vint1. The fifth transistor M5 turned on provides the second initialization signal of the second initialization signal end VINIT2 for the second electrode of the drive transistor M0, such that VM0s=Vint2. The fourth transistor M4 turned on turns on the gate electrode and the first electrode of the drive transistor M0, such that the drive transistor M0 forms a diode connection mode. The voltage of the gate electrode of the drive transistor M0 is discharged via a path from the fourth transistor M4, the drive transistor M0 and the fifth transistor M5 to the second initialization signal end VINIT2, such that the voltage of the gate electrode of the drive transistor M0 is constantly reduced from Vdd.

In stage T22 of the threshold compensation and data writing stage T2, the third transistor M3 is turned on under control of the high level of the first compensation control signal, the fourth transistor M4 is turned on under control of the high level of the second compensation control signal, the fifth transistor M5 is turned on under control of the high level of the third compensation control signal, the sixth transistor M6 is turned on under control of a high level of the scanning signal, and the first transistor M1 and the seventh transistor M7 are turned off under control of the low level of the light emitting control signal. The third transistor M3 turned on provides the first initialization signal of the first initialization signal end VINIT1 for the second node N2, such that VN2=Vint1. The fifth transistor M5 turned on provides the second initialization signal of the second initialization signal end VINIT2 for the second electrode of the drive transistor M0, such that VM0*s*=Vint2. The fourth transistor M4 turned on turns on the gate electrode and the first electrode of the drive transistor M0, such that the drive transistor M0 forms a diode connection mode. The voltage of the gate electrode of the drive transistor M0 is continuously discharged via the path from the fourth transistor M4, the drive transistor M0 and the fifth transistor M5 to the second initialization signal end VINIT2 until VM0*g*=Vint2+Vth. In this case, compensation of the threshold voltage is completed, and the drive transistor M0 is turned off. The sixth transistor M6 turned on inputs the data voltage Vda of the data signal end DA to the first node N1, such that VN1=Vda. Vda needs to be smaller than Voled, so as to ensure that the light emitting device L does not emit light.

In the light emitting stage T3, the third transistor M3 is turned off under control of a low level of the first compensation control signal, the fourth transistor M4 is turned off under control of a low level of the second compensation control signal, the fifth transistor M5 is turned off under control of a low level of the third compensation control signal, the sixth transistor M6 is turned off under control of the low level of the scanning signal, and the first transistor M1 and the seventh transistor M7 are turned on under control of the high level of the light emitting control signal. A first capacitor C1 and a second capacitor C2 are connected in series to form a new capacitor, and the voltage of the gate electrode of the drive transistor M0 is in a floating state. Since the seventh transistor M7 is turned on, the high voltage of the first power end ELVDD is input to the first electrode of the drive transistor M0, and the drive transistor M0 generates a drive current. The drive current flows through the drive transistor M0 so as to charge the anode of the light emitting device L, such that VM0*s* gradually rises to Vss+Voled. Voled is a voltage difference between a cathode and the anode of the light emitting device L during light emission. Due to a coupling effect of the first capacitor C1 and the second capacitor C2, variations of VM0*s* and VN2 may be coupled to the gate electrode of the drive transistor M0. If a voltage variation of the gate electrode of the drive transistor M0 is Vss+Voled−Vda, VM0*g*=Vint2+Vth+Vss+Voled−Vda. Therefore, if a voltage difference Vgs between the gate electrode and a source electrode of the drive transistor M0 is Vint2+Vth-Vda, the drive transistor M0 works in a saturation zone, and a drive current-generated may be expressed as: $I=K*(Vgs-Vth)^2=K*(Vint2-Vda)^2$. $K=1/2*\mu*Cox*W/L$, where μ denotes a mobility ratio of the drive transistor M0, Cox denotes capacitance of a gate insulating layer, and W/L denotes a channel width-length ratio of the drive transistor M0.

In some other examples, reference may be made to the description for a working process of a pixel drive circuit shown in FIG. 7 in combination with the signal sequence diagram shown in FIG. 5B, which will not be repeated herein.

In addition, reference may be made to the above description for a working process of the pixel drive circuit shown in FIG. 7 in a black frame inserted, which will not be repeated herein.

Figure 8:
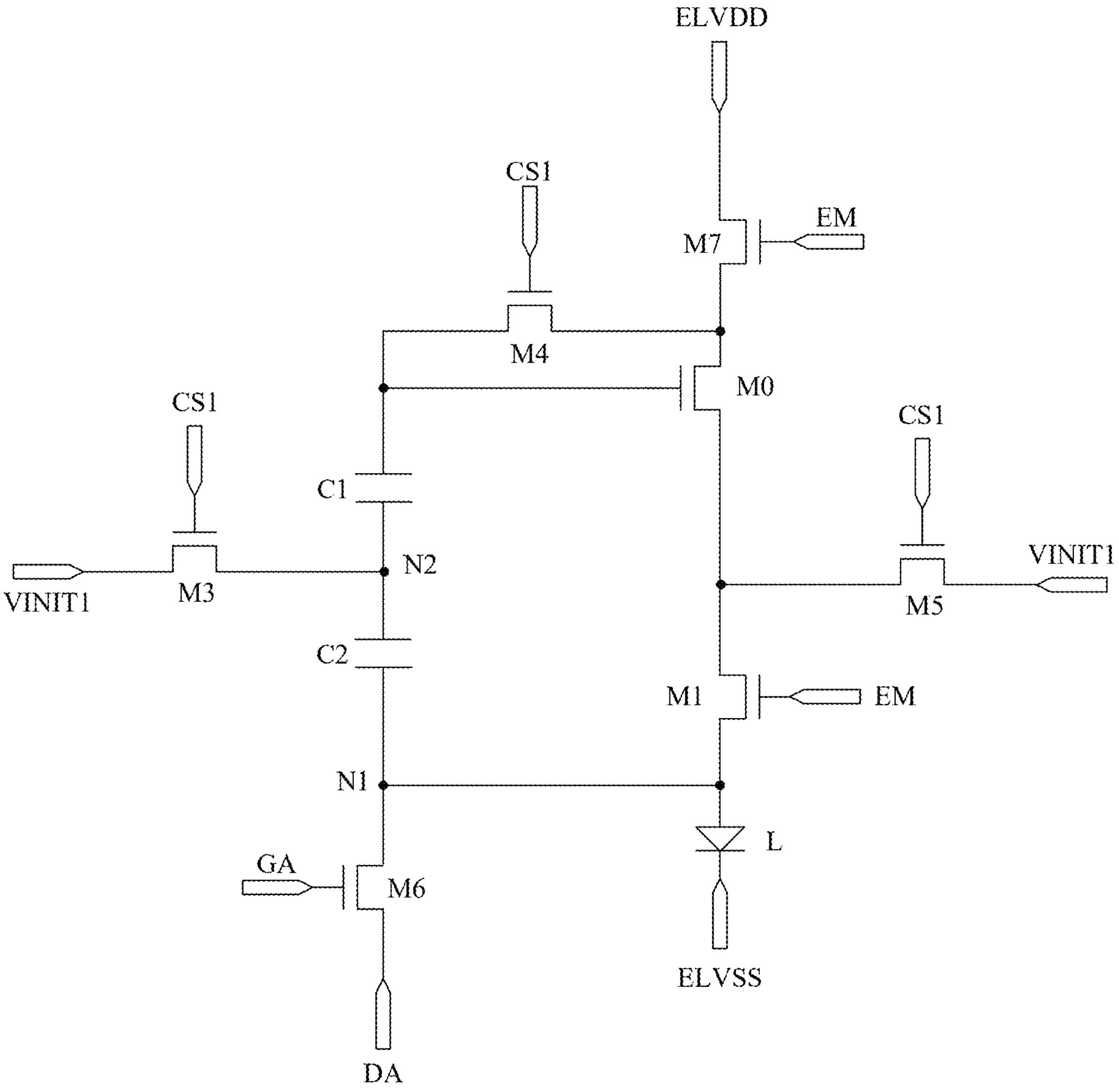
FIG. 8 is a specific schematic structural diagram of yet some other pixel circuits according to an embodiment of the disclosure.

An embodiment of the disclosure provides some other schematic structural diagrams of the pixel circuit. As shown in FIG. 8, implementations in the above embodiments are modified. Only differences between the embodiment and the above embodiments will be described below, and similarities will not be repeated herein.

In the embodiment of the disclosure, a first compensation control signal end CS1 and a second compensation control signal end CS2 may be the same signal end. For example, as shown in FIG. 8, a gate electrode of a fourth transistor M4 is coupled to the first compensation control signal end CS1. In this way, a number of signal wires can be reduced, and wiring difficulty can be reduced.

In the embodiment of the disclosure, the first compensation control signal end CS1 and a third compensation control signal end CS3 may be the same signal end. For example, as shown in FIG. 8, a gate electrode of a fifth transistor M5 is coupled to the first compensation control signal end CS1. In this way, a number of signal wires can be reduced, and wiring difficulty can be reduced.

In the embodiment of the disclosure, a first initialization signal end VINIT1 and a second initialization signal end VINIT2 may be the same signal end. For example, as shown in FIG. 8, a first electrode of the fifth transistor M5 is coupled to the first initialization signal end VINIT1. In this way, a number of signal wires can be reduced, and wiring difficulty can be reduced.

A signal sequence diagram corresponding to the pixel circuit shown in FIG. 8 may be as shown in FIG. 5A. In addition, reference may be made to the description of the above embodiment for a specific working process of the pixel circuit shown in FIG. 8 in combination with the signal sequence diagram shown in FIG. 5A, which will not be repeated herein.

Figure 9:
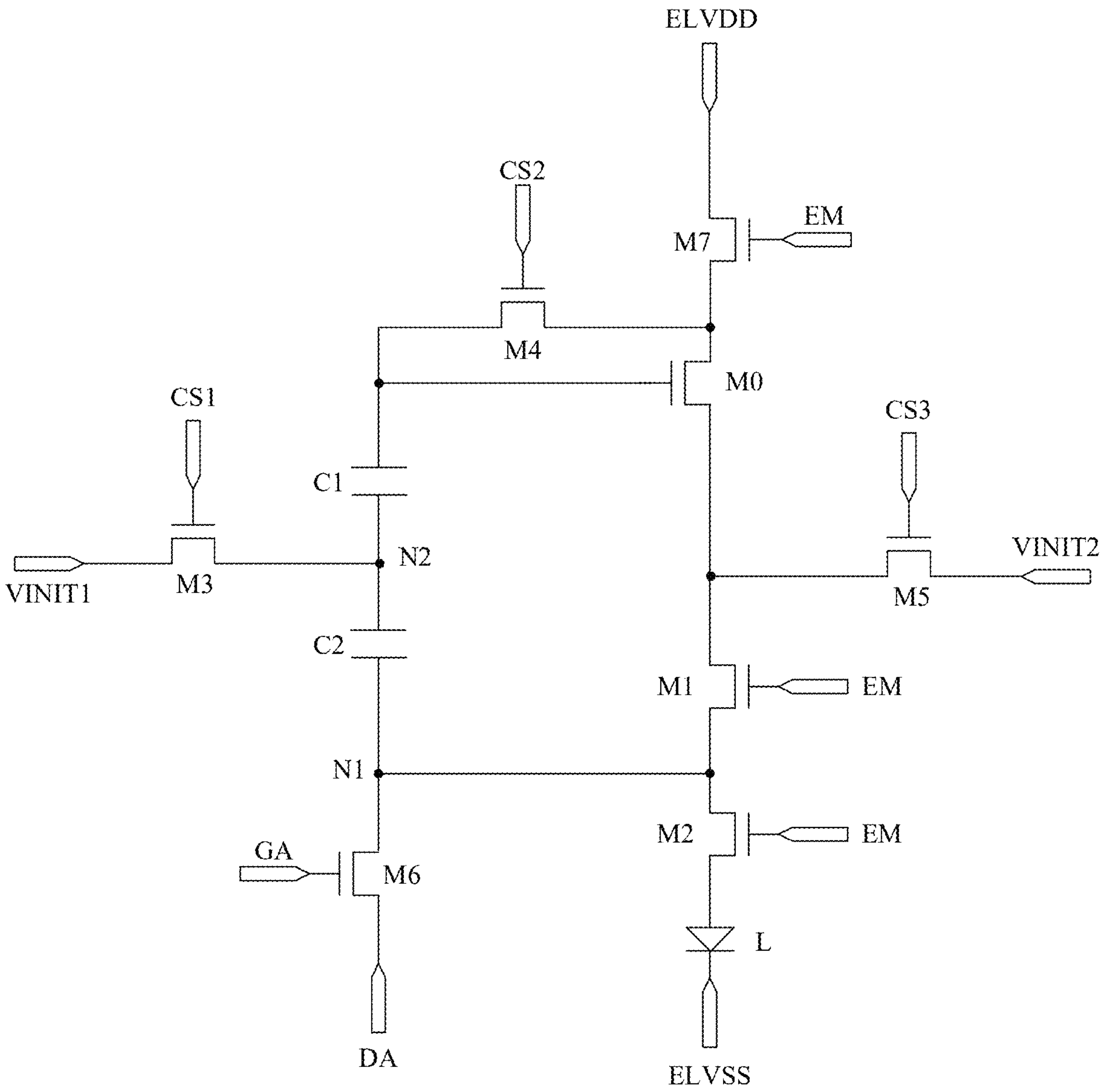
FIG. 9 is a specific schematic structural diagram of yet some other pixel circuits according to an embodiment of the disclosure.

An embodiment of the disclosure provides some other schematic structural diagrams of the pixel circuit. As shown in FIG. 9, implementations in the above embodiments are modified. Only differences between the embodiment and the above embodiments will be described below, and similarities will not be repeated herein.

In the embodiment of the disclosure, as shown in FIG. 9, a turning-on control circuit further includes: a second transistor M2. A second electrode of a drive transistor M0 is connected to a light emitting device L sequentially by means of a first transistor M1 and the second transistor M2. A gate electrode of the second transistor M2 is coupled to a light emitting control signal end EM. A first electrode of the second transistor M2 is coupled to a first node N1. A second electrode of the second transistor M2 is coupled to the light emitting device L.

For example, the second transistor M2 is turned on under control of an effective level of a light emitting control signal of the light emitting control signal end EM, and turned off under control of an ineffective level of the light emitting control signal. Optionally, if the second transistor M2 is an N-type transistor, the effective level and the ineffective level of the light emitting control signal are a high level and a low level respectively. Alternatively, if the second transistor M2 is a P-type transistor, the effective level and the ineffective level of the light emitting control signal are a low level and a high level respectively.

In some examples, with a pixel drive circuit shown in FIG. 9 as an example, in combination with a signal sequence diagram shown in FIG. 5A, a working process of the pixel circuit according to the embodiment of the disclosure will be described below.

In the initialization stage T1, a third transistor M3 is turned on under control of a high level of the first compensation control signal, a fourth transistor M4 is turned on under control of a high level of the second compensation control signal, a fifth transistor M5 is turned on under control of a high level of the third compensation control signal, a sixth transistor M6 is turned off under control of a low level of the scanning signal, and a first transistor M1, a second transistor M2 and a seventh transistor M7 are turned on under control of a high level of the light emitting control signal. The seventh transistor M7 turned on inputs a voltage of the first power end ELVDD to the first electrode of the drive transistor M0, and initializes the first electrode of the drive transistor M0. The fourth transistor M4 turned on turns on the gate electrode and the first electrode of the drive transistor M0, such that the voltage VM0*g* of the gate electrode of the drive transistor M0 is equal to the voltage Vdd of the first power end ELVDD, that is, VM0*g*=Vdd. The gate electrode of the drive transistor M0 is initialized. The fifth transistor M5 turned on provides a second initialization signal of a second initialization signal end VINIT2 for a second electrode of the drive transistor M0, such that a voltage VM0*s* of the second electrode of the drive transistor M0 is equal to a voltage Vint2 of the second initialization signal, that is, VM0*s*=Vint2. The second electrode of the drive transistor M0 is initialized. The first transistor M1 turned on turns on the second electrode of the drive transistor M0 and the first node N1, such that the voltage VN1 of the first node N1 is equal to the voltage Vint2 of the second initialization signal, that is, VN1=Vint2. The first node N1 is initialized. The second transistor M2 turned on turns on the first node N1 and an anode of a light emitting device L, such that a voltage of the anode of the light emitting device L is Vint2, and the anode of the light emitting device L is initialized. The third transistor M3 turned on provides a first initialization signal of a first initialization signal end VINIT1 for the second node N2, such that a voltage VN2 of the second node N2 is equal to a voltage Vint1 of the first initialization signal, that is, VN2=Vint1. The second node N2 is initialized.

In the threshold compensation and data writing stage T2, the second transistor M2 is turned off under control of a low level of the light emitting control signal. Reference may be made to the above description for working processes of the other transistors, which will not be repeated herein.

In the light emitting stage T3, the second transistor M2 is turned on under control of the high level of the light emitting control signal. Reference may be made to the above description for working processes of the other transistors, which will not be repeated herein.

In some other examples, reference may be made to the description for a working process of a pixel drive circuit shown in FIG. 9 in combination with the signal sequence diagram shown in FIG. 5B, which will not be repeated herein.

In addition, reference may be made to the above description for a working process of the pixel drive circuit shown in FIG. 9 in a black frame inserted, which will not be repeated herein.

Figure 10:
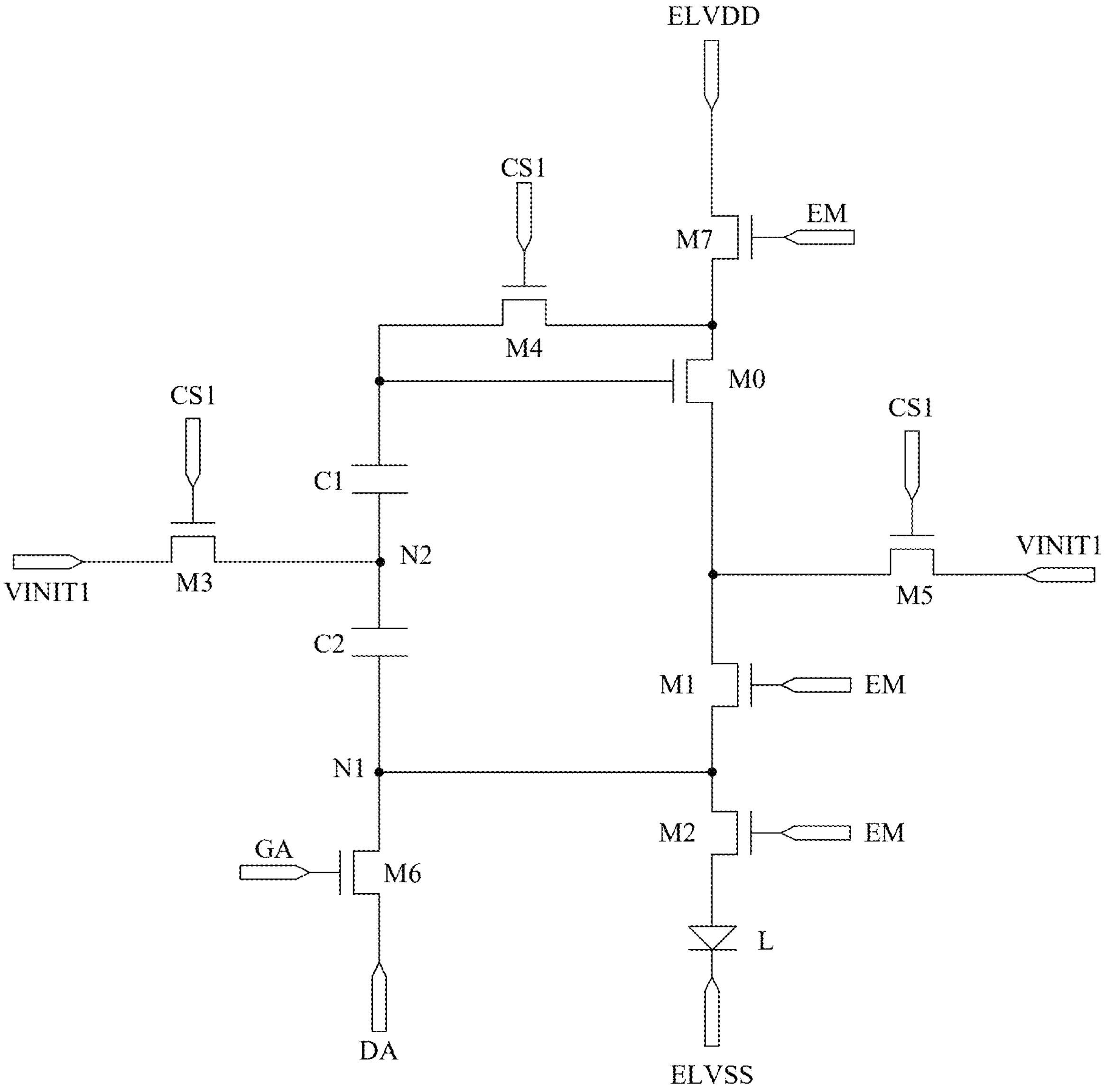
FIG. 10 is a specific schematic structural diagram of yet some other pixel circuits according to an embodiment of the disclosure.

An embodiment of the disclosure provides some other schematic structural diagrams of the pixel circuit. As shown in FIG. 10, implementations in the above embodiments are modified. Only differences between the embodiment and the above embodiments will be described below, and similarities will not be repeated herein.

In the embodiment of the disclosure, a first compensation control signal end CS1 and a second compensation control signal end CS2 may be the same signal end. For example, as shown in FIG. 10, a gate electrode of a fourth transistor M4 is coupled to the first compensation control signal end CS1. In this way, a number of signal wires can be reduced, and wiring difficulty can be reduced.

In the embodiment of the disclosure, the first compensation control signal end CS1 and the third compensation control signal end CS3 may be the same signal end. For example, as shown in FIG. 10, a gate electrode of a fifth transistor M5 is coupled to the first compensation control signal end CS1. In this way, a number of signal wires can be reduced, and wiring difficulty can be reduced.

In the embodiment of the disclosure, a first initialization signal end VINIT1 and a second initialization signal end VINIT2 may be the same signal end. For example, as shown in FIG. 10, a first electrode of the fifth transistor M5 is coupled to the first initialization signal end VINIT1. In this way, a number of signal wires can be reduced, and wiring difficulty can be reduced.

A signal sequence diagram corresponding to the pixel circuit shown in FIG. 10 may be as shown in FIG. 5A. In addition, reference may be made to the description of the above embodiment for a specific working process of the pixel circuit shown in FIG. 10 in combination with the signal sequence diagram shown in FIG. 5A, which will not be repeated herein.

Figure 11:
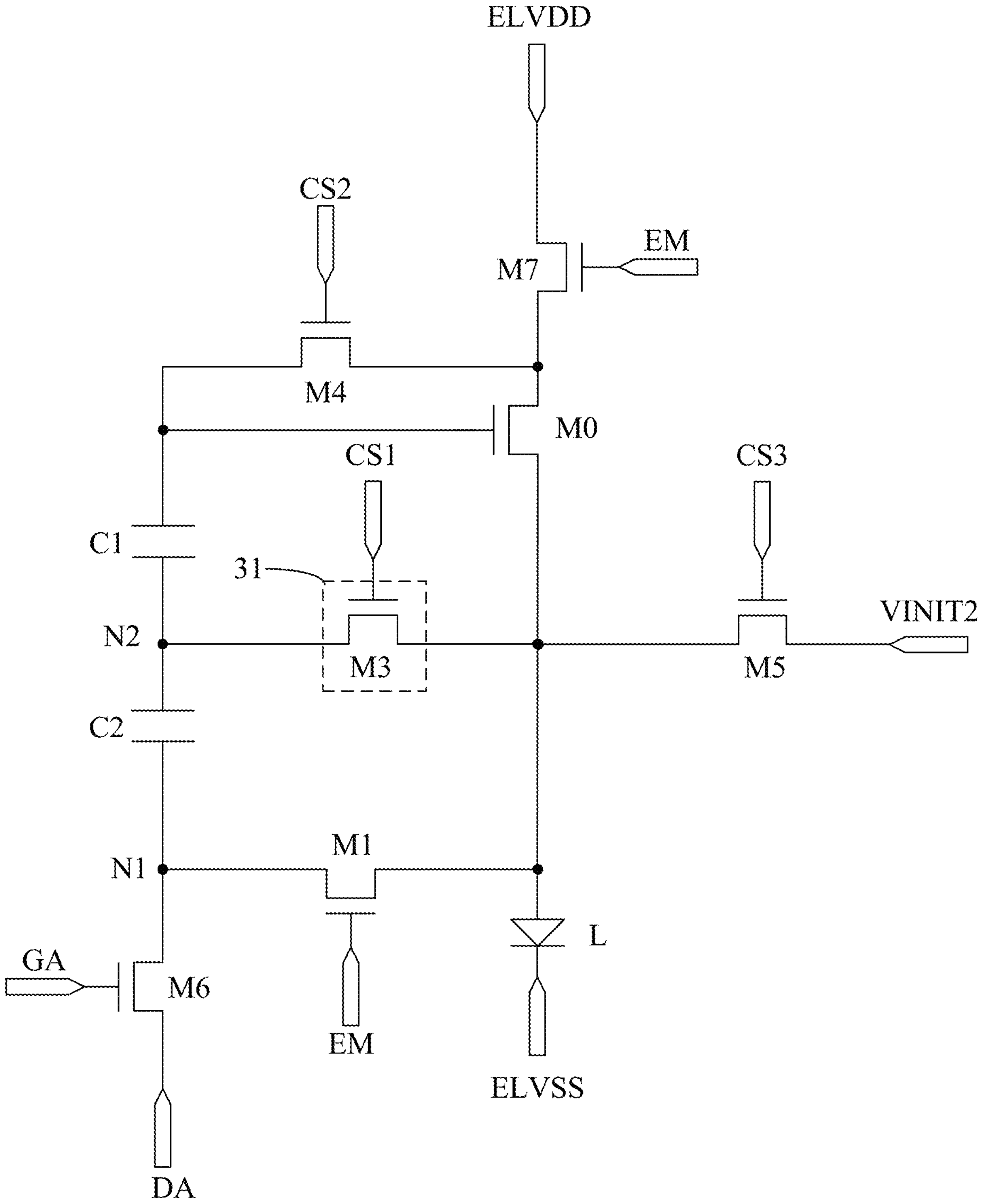
FIG. 11 is a specific schematic structural diagram of yet some other pixel circuits according to an embodiment of the disclosure.

An embodiment of the disclosure provides some other schematic structural diagrams of the pixel circuit. As shown in FIG. 11, implementations in the above embodiments are modified. Only differences between the embodiment and the above embodiments will be described below, and similarities will not be repeated herein.

In the embodiment of the disclosure, as shown in FIG. 11, a first threshold compensation sub-circuit 31 is configured to provide a signal of a second electrode of a drive transistor M0 for a second node N2 in response to a signal of a first compensation control signal end CS1.

In the embodiment of the disclosure, as shown in FIG. 11, a gate electrode of a third transistor M3 is coupled to the first compensation control signal end CS1, a first electrode of the third transistor M3 is coupled to the second node N2, and a second electrode of the third transistor M3 is coupled to the second electrode of the drive transistor M0.

In some examples, with a pixel drive circuit shown in FIG. 11 as an example, in combination with a signal sequence diagram shown in FIG. 5A, a working process of the pixel circuit according to the embodiment of the disclosure will be described below.

In the initialization stage T1, a third transistor M3 is turned on under control of a high level of the first compensation control signal, a fourth transistor M4 is turned on under control of a high level of the second compensation control signal, a fifth transistor M5 is turned on under control of a high level of the third compensation control signal, a sixth transistor M6 is turned off under control of a low level of the scanning signal, and a first transistor M1 and a seventh transistor M7 are turned on under control of a high level of the light emitting control signal. The seventh transistor M7 turned on inputs a voltage of a first power end ELVDD to a first electrode of a drive transistor M0, and initializes the first electrode of the drive transistor M0. The fourth transistor M4 turned on turns on a gate electrode and the first electrode of the drive transistor M0, such that a voltage VM0*g* of the gate electrode of the drive transistor M0 is equal to the voltage Vdd of the first power end ELVDD, that is, VM0*g*=Vdd. The gate electrode of the drive transistor M0 is initialized. The fifth transistor M5 turned on provides a second initialization signal of a second initialization signal end VINIT2 for a second electrode of the drive transistor M0, such that a voltage VM0*s* of the second electrode of the drive transistor M0 is equal to a voltage Vint2 of the second initialization signal, that is, VM0*s*=Vint2. The second electrode of the drive transistor M0 is initialized. The first transistor M1 turned on turns on the second electrode of the drive transistor M0 and a first node N1, such that a voltage VN1 of the first node N1 is equal to the voltage Vint2 of the second initialization signal, that is, VN1=Vint2. The first node N1 and an anode of a light emitting device L are initialized. The third transistor M3 turned on provides a signal of the second electrode of the drive transistor M0 for the second node N2, such that a voltage VN2 of the second node N2 is equal to Vint2, and the second node N2 is initialized.

In stage T21 of the threshold compensation and data writing stage T2, the third transistor M3 is turned on under control of the high level of the first compensation control signal, the fourth transistor M4 is turned on under control of the high level of the second compensation control signal, the fifth transistor M5 is turned on under control of the high level of the third compensation control signal, the sixth transistor M6 is turned off under control of the low level of the scanning signal, and the first transistor M1 and the seventh transistor M7 are turned off under control of a low level of the light emitting control signal. The third transistor M3 turned on provides the signal of the second electrode of the drive transistor M0 for the second node N2, such that VN2=Vint2. The fifth transistor M5 turned on provides the second initialization signal of the second initialization signal end VINIT2 for the second electrode of the drive transistor M0, such that VM0*s*=Vint2. The fourth transistor M4 turned on turns on the gate electrode and the first electrode of the drive transistor M0, such that the drive transistor M0 forms a diode connection mode. The voltage of the gate electrode of the drive transistor M0 is discharged via a path from the fourth transistor M4, the drive transistor M0 and the fifth transistor M5 to the second initialization signal end VINIT2, such that the voltage of the gate electrode of the drive transistor M0 is constantly reduced from Vdd.

In stage T22 of the threshold compensation and data writing stage T2, the third transistor M3 is turned on under control of the high level of the first compensation control signal, the fourth transistor M4 is turned on under control of the high level of the second compensation control signal, the fifth transistor M5 is turned on under control of the high level of the third compensation control signal, the sixth transistor M6 is turned on under control of a high level of the scanning signal, and the first transistor M1 and the seventh transistor M7 are turned off under control of the low level of the light emitting control signal. The third transistor M3 turned on provides the signal of the second electrode of the drive transistor M0 for the second node N2, such that VN2=Vint2. The fifth transistor M5 turned on provides the second initialization signal of the second initialization signal end VINIT2 for the second electrode of the drive transistor M0, such that VM0*s*=Vint2. The fourth transistor M4 turned on turns on the gate electrode and the first electrode of the drive transistor M0, such that the drive transistor M0 forms a diode connection mode. The voltage of the gate electrode of the drive transistor M0 is continuously discharged via the path from the fourth transistor M4, the drive transistor M0 and the fifth transistor M5 to the second initialization signal end VINIT2 until VM0*g*=Vint2+Vth. In this case, compensation of the threshold voltage is completed, and the drive transistor M0 is turned off. The sixth transistor M6 turned on inputs the data voltage Vda of the data signal end DA to the first node N1, such that VN1=Vda.

In the light emitting stage T3, the third transistor M3 is turned off under control of a low level of the first compensation control signal, the fourth transistor M4 is turned off under control of a low level of the second compensation control signal, the fifth transistor M5 is turned off under control of a low level of the third compensation control signal, the sixth transistor M6 is turned off under control of the low level of the scanning signal, and the first transistor M1 and the seventh transistor M7 are turned on under control of the high level of the light emitting control signal. A first capacitor C1 and a second capacitor C2 are connected in series to form a new capacitor, and the voltage of the gate electrode of the drive transistor M0 is in a floating state. Since the seventh transistor M7 is turned on, the high voltage of the first power end ELVDD is input to the first electrode of the drive transistor M0, and the drive transistor M0 generates a drive current. The drive current flows through the drive transistor M0 so as to charge the anode of the light emitting device L, such that VM0*s* gradually rises to Vss+Voled. Voled is a voltage difference between a cathode and the anode of the light emitting device L during light emission. Due to a coupling effect of the first capacitor C1 and the second capacitor C2, variations of VM0*s* and VN2 may be coupled to the gate electrode of the drive transistor M0. If a voltage variation of the gate electrode of the drive transistor M0 is Vss+Voled−Vda, VM0*g*=Vint2+Vth+Vss+Voled−Vda. Therefore, if a voltage difference Vgs between the gate electrode and a source electrode of the drive transistor M0 is Vint2+Vth−Vda, the drive transistor M0 works in a saturation zone, and a drive current I generated may be expressed as: $I=K*(Vgs-Vth)^2=K*(Vint2-Vda)^2$. $K=1/2*\mu*Cox*W/L$, where μ denotes a mobility ratio of the drive transistor M0, Cox denotes capacitance of a gate insulating layer, and W/L denotes a channel width-length ratio of the drive transistor M0.

In some other examples, reference may be made to the description for a working process of a pixel drive circuit shown in FIG. 11 in combination with the signal sequence diagram shown in FIG. 5B, which will not be repeated herein.

In addition, reference may be made to the above description for a working process of the pixel drive circuit shown in FIG. 11 in a black frame inserted, which will not be repeated herein.

Figure 12:
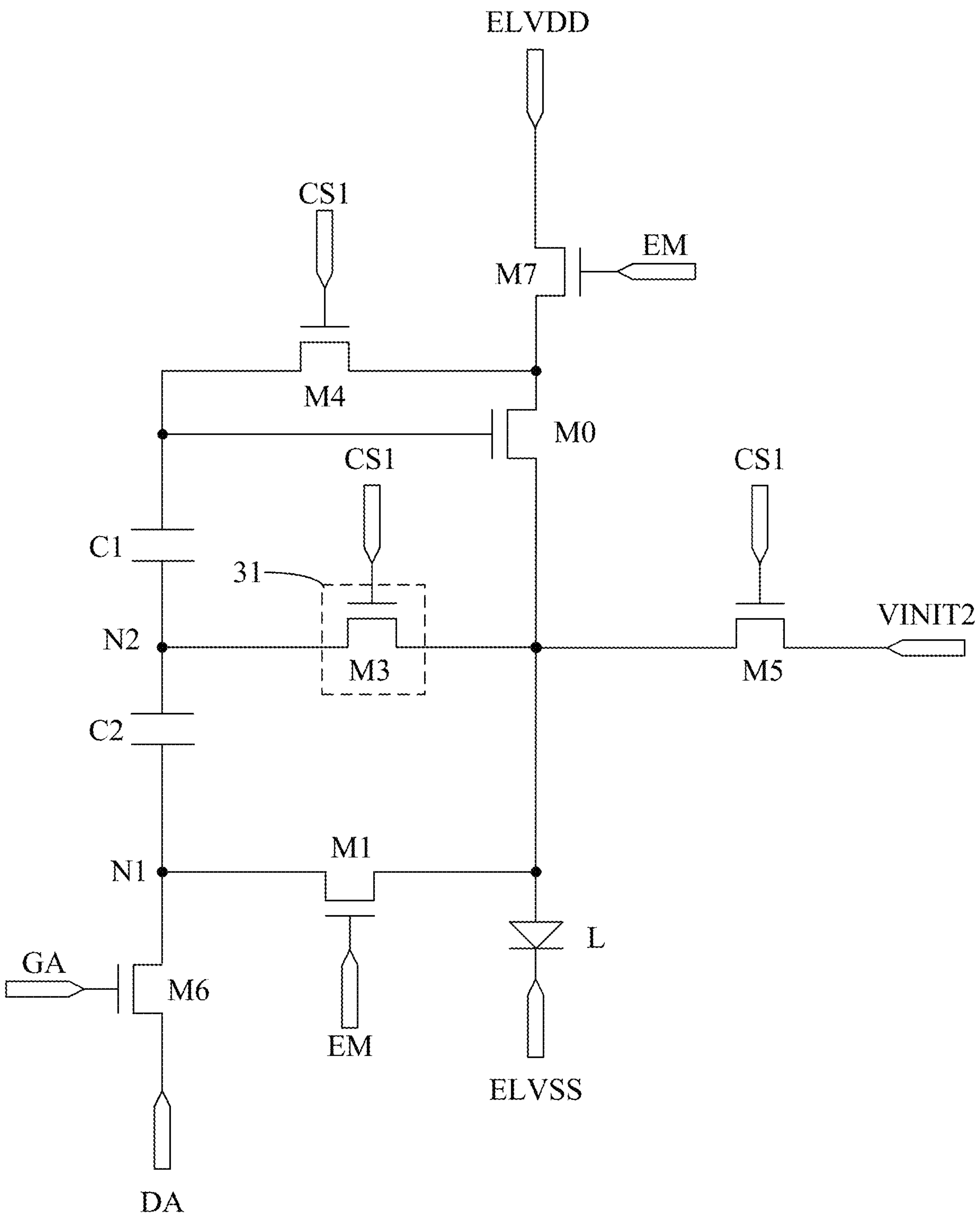
FIG. 12 is a specific schematic structural diagram of yet some other pixel circuits according to an embodiment of the disclosure.

An embodiment of the disclosure provides some other schematic structural diagrams of the pixel circuit. As shown in FIG. 12, implementations in the above embodiments are modified. Only differences between the embodiment and the above embodiments will be described below, and similarities will not be repeated herein.

In the embodiment of the disclosure, a first compensation control signal end CS1 and a second compensation control signal end CS2 may be the same signal end. For example, as shown in FIG. 12, a gate electrode of a fourth transistor M4 is coupled to the first compensation control signal end CS1. In this way, a number of signal wires can be reduced, and wiring difficulty can be reduced.

In the embodiment of the disclosure, the first compensation control signal end CS1 and a third compensation control signal end CS3 may be the same signal end. For example, as shown in FIG. 12, a gate electrode of a fifth transistor M5 is coupled to the first compensation control signal end CS1. In this way, a number of signal wires can be reduced, and wiring difficulty can be reduced.

A signal sequence diagram corresponding to the pixel circuit shown in FIG. 12 may be as shown in FIG. 5A. In addition, reference may be made to the description of the above embodiment for a specific working process of the pixel circuit shown in FIG. 12 in combination with the signal sequence diagram shown in FIG. 5A, which will not be repeated herein.

Figure 13:
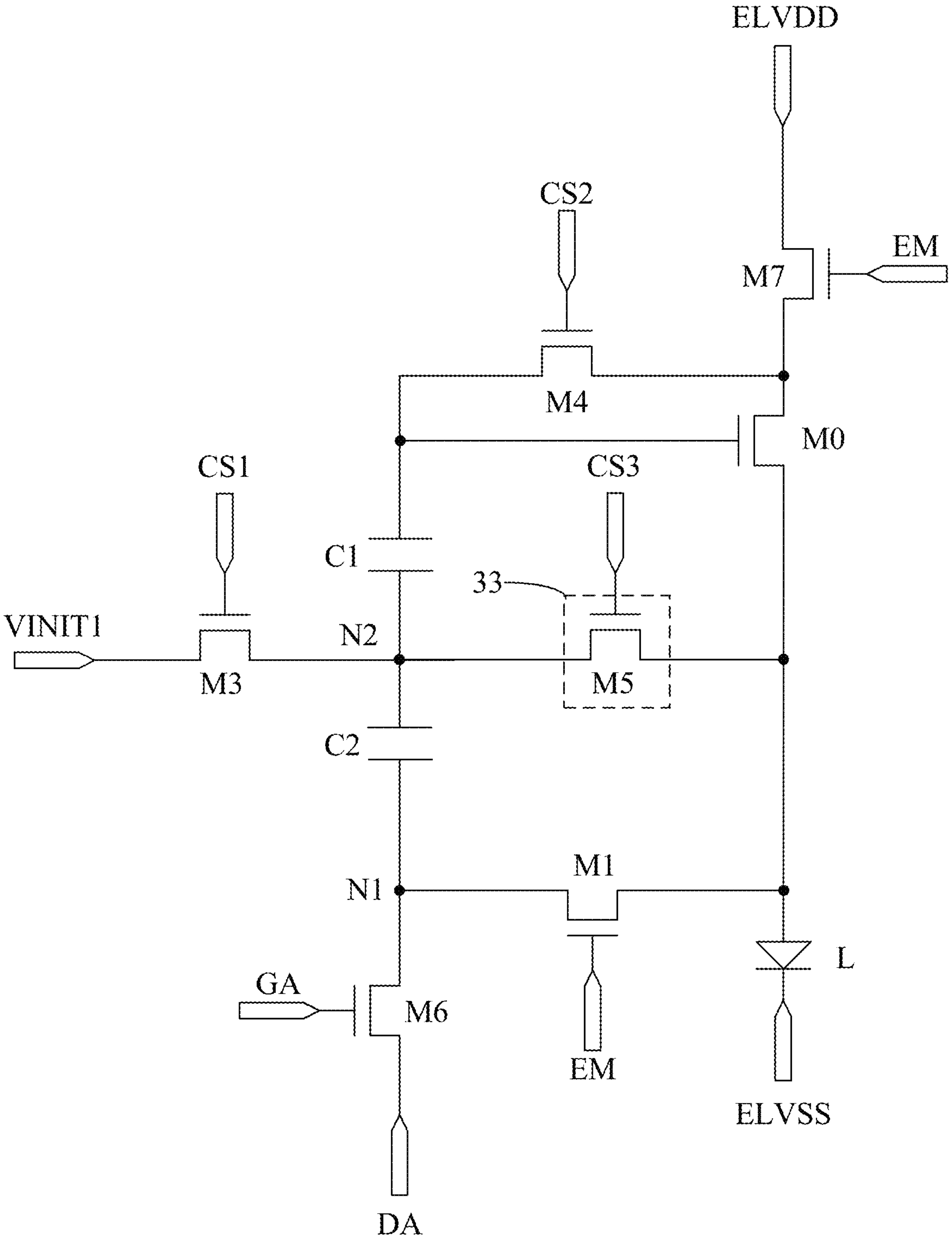
FIG. 13 is a specific schematic structural diagram of yet some other pixel circuits according to an embodiment of the disclosure.

An embodiment of the disclosure provides some other schematic structural diagrams of the pixel circuit. As shown in FIG. 13, implementations in the above embodiments are modified. Only differences between the embodiment and the above embodiments will be described below, and similarities will not be repeated herein.

In the embodiment of the disclosure, as shown in FIG. 13, a third threshold compensation sub-circuit 33 is configured to provide a signal of a second node N2 for a second electrode of a drive transistor M0 in response to a signal of a third compensation control signal end CS3.

In the embodiment of the disclosure, as shown in FIG. 13, a gate electrode of a fifth transistor M5 is coupled to the third compensation control signal end CS3, a first electrode of the fifth transistor M5 is coupled to the second node N2, and a second electrode of the fifth transistor M5 is coupled to the second electrode of the drive transistor M0.

In some examples, with a pixel drive circuit shown in FIG. 13 as an example, in combination with a signal sequence diagram shown in FIG. 5A, a working process of the pixel circuit according to the embodiment of the disclosure will be described below.

In the initialization stage T1, a third transistor M3 is turned on under control of a high level of the first compensation control signal, a fourth transistor M4 is turned on under control of a high level of the second compensation control signal, a fifth transistor M5 is turned on under control of a high level of the third compensation control signal, a sixth transistor M6 is turned off under control of a low level of the scanning signal, and a first transistor M1 and a seventh transistor M7 are turned on under control of a high level of the light emitting control signal. The seventh transistor M7 turned on inputs a voltage of a first power end ELVDD to a first electrode of a drive transistor M0, and initializes the first electrode of the drive transistor M0. The fourth transistor M4 turned on turns on a gate electrode and the first electrode of the drive transistor M0, such that a voltage VM0*g* of the gate electrode of the drive transistor M0 is equal to the voltage Vdd of the first power end ELVDD, that is, VM0*g*=Vdd. The gate electrode of the drive transistor M0 is initialized. The third transistor M3 turned on provides a signal of the second electrode of the drive transistor M0 for the second node N2, such that a voltage VN2 of the second node N2 is equal to Vint1, and the second node N2 is initialized. The fifth transistor M5 turned on provides a signal of the second node N2 for the second electrode of the drive transistor M0, such that VM0*s*=Vint1, and the second electrode of the drive transistor M0 and an anode of a light emitting device L are initialized. The first transistor M1 turned on turns on the second electrode of the drive transistor M0 and a first node N1, such that VN1=Vint1, and the first node N1 is initialized.

In stage T21 of the threshold compensation and data writing stage T2, the third transistor M3 is turned on under control of the high level of the first compensation control signal, the fourth transistor M4 is turned on under control of the high level of the second compensation control signal, the fifth transistor M5 is turned on under control of the high level of the third compensation control signal, the sixth transistor M6 is turned off under control of the low level of the scanning signal, and the first transistor M1 and the seventh transistor M7 are turned off under control of a low level of the light emitting control signal. The third transistor M3 turned on enables VN2=Vint1. The fifth transistor M5 turned on enables VM0*s*=Vint1. The fourth transistor M4 turned on turns on the gate electrode and the first electrode of the drive transistor M0, such that the drive transistor M0 forms a diode connection mode. The voltage of the gate electrode of the drive transistor M0 is discharged via a path from the fourth transistor M4, the drive transistor M0 and the fifth transistor M5 to the second initialization signal end VINIT2, such that the voltage of the gate electrode of the drive transistor M0 is constantly reduced from Vdd.

In stage T22 of the threshold compensation and data writing stage T2, the third transistor M3 is turned on under control of the high level of the first compensation control signal, the fourth transistor M4 is turned on under control of the high level of the second compensation control signal, the fifth transistor M5 is turned on under control of the high level of the third compensation control signal, the sixth transistor M6 is turned on under control of a high level of the scanning signal, and the first transistor M1 and the seventh transistor M7 are turned off under control of the low level of the light emitting control signal. The third transistor M3 turned on enables VN2=Vint1. The fifth transistor M5 turned on enables VM0*s*=Vint1. The fourth transistor M4 turned on turns on the gate electrode and the first electrode of the drive transistor M0, such that the drive transistor M0 forms a diode connection mode. The voltage of the gate electrode of the drive transistor M0 is continuously discharged via the path from the fourth transistor M4, the drive transistor M0 and the fifth transistor M5 to the second initialization signal end VINIT2 until VM0*g*=Vint1+Vth. In this case, compensation of the threshold voltage is completed, and the drive transistor M0 is turned off. The sixth transistor M6 turned on inputs the data voltage Vda of the data signal end DA to the first node N1, such that VN1=Vda.

In the light emitting stage T3, the third transistor M3 is turned off under control of a low level of the first compensation control signal, the fourth transistor M4 is turned off under control of a low level of the second compensation control signal, the fifth transistor M5 is turned off under control of a low level of the third compensation control signal, the sixth transistor M6 is turned off under control of the low level of the scanning signal, and the first transistor M1 and the seventh transistor M7 are turned on under control of the high level of the light emitting control signal. A first capacitor C1 and a second capacitor C2 are connected in series to form a new capacitor, and the voltage of the gate electrode of the drive transistor M0 is in a floating state. Since the seventh transistor M7 is turned on, the high voltage of the first power end ELVDD is input to the first electrode of the drive transistor M0, and the drive transistor M0 generates a drive current. The drive current flows through the drive transistor M0 so as to charge the anode of the light emitting device L, such that VM0$s$ gradually rises to Vss+Voled. Voled is a voltage difference between a cathode and the anode of the light emitting device L during light emission. Due to a coupling effect of the first capacitor C1 and the second capacitor C2, variations of VM0$s$ and VN2 may be coupled to the gate electrode of the drive transistor M0. If a voltage variation of the gate electrode of the drive transistor M0 is Vss+Voled−Vda, VM0$g$=Vint1+Vth+Vss+Voled−Vda. Therefore, if a voltage difference Vgs between the gate electrode and a source electrode of the drive transistor M0 is Vint1+Vth−Vda, the drive transistor M0 works in a saturation zone, and a drive current I generated may be expressed as: $I=K*(Vgs-Vth)^2=K*(Vint1-Vda)^2$. $K=1/2*\mu*Cox*W/L$, where μ denotes a mobility ratio of the drive transistor M0, Cox denotes capacitance of a gate insulating layer, and W/L denotes a channel width-length ratio of the drive transistor M0.

In some other examples, reference may be made to the description for a working process of a pixel drive circuit shown in FIG. 13 in combination with the signal sequence diagram shown in FIG. 5B, which will not be repeated herein.

In addition, reference may be made to the above description for a working process of the pixel drive circuit shown in FIG. 13 in a black frame inserted, which will not be repeated herein.

Figure 14:
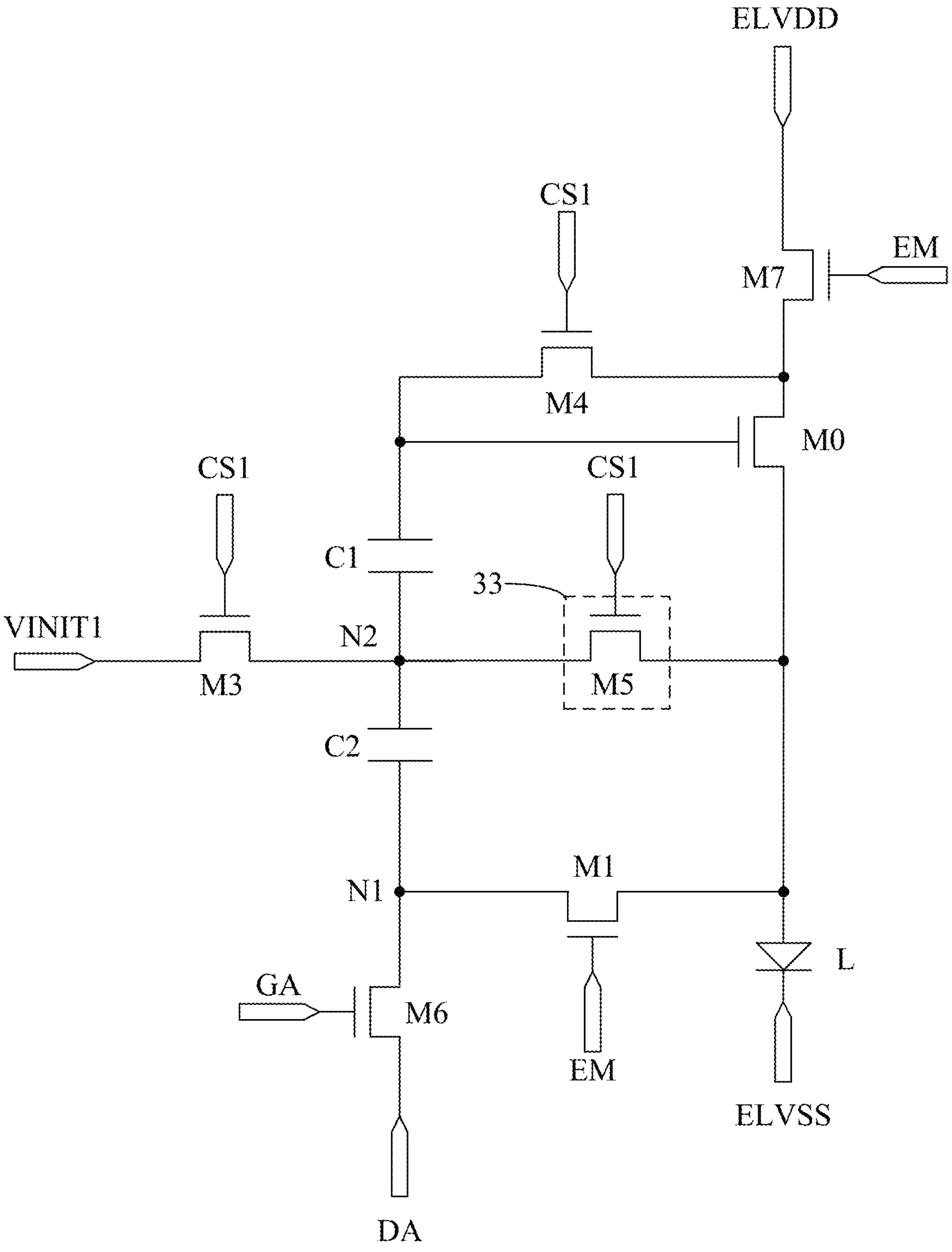
FIG. 14 is a specific schematic structural diagram of yet some other pixel circuits according to an embodiment of the disclosure.

An embodiment of the disclosure provides some other schematic structural diagrams of the pixel circuit. As shown in FIG. 14, implementations in the above embodiments are modified. Only differences between the embodiment and the above embodiments will be described below, and similarities will not be repeated herein.

In the embodiment of the disclosure, a first compensation control signal end CS1 and a second compensation control signal end CS2 may be the same signal end. For example, as shown in FIG. 14, a gate electrode of a fourth transistor M4 is coupled to the first compensation control signal end CS1. In this way, a number of signal wires can be reduced, and wiring difficulty can be reduced.

In the embodiment of the disclosure, the first compensation control signal end CS1 and a third compensation control signal end CS3 may be the same signal end. For example, as shown in FIG. 14, a gate electrode of a fifth transistor M5 is coupled to the first compensation control signal end CS1. In this way, a number of signal wires can be reduced, and wiring difficulty can be reduced.

A signal sequence diagram corresponding to the pixel circuit shown in FIG. 14 may be as shown in FIG. 5A. In addition, reference may be made to the description of the above embodiment for a specific working process of the pixel circuit shown in FIG. 14 in combination with the signal sequence diagram shown in FIG. 5A, which will not be repeated herein.

Figure 15:
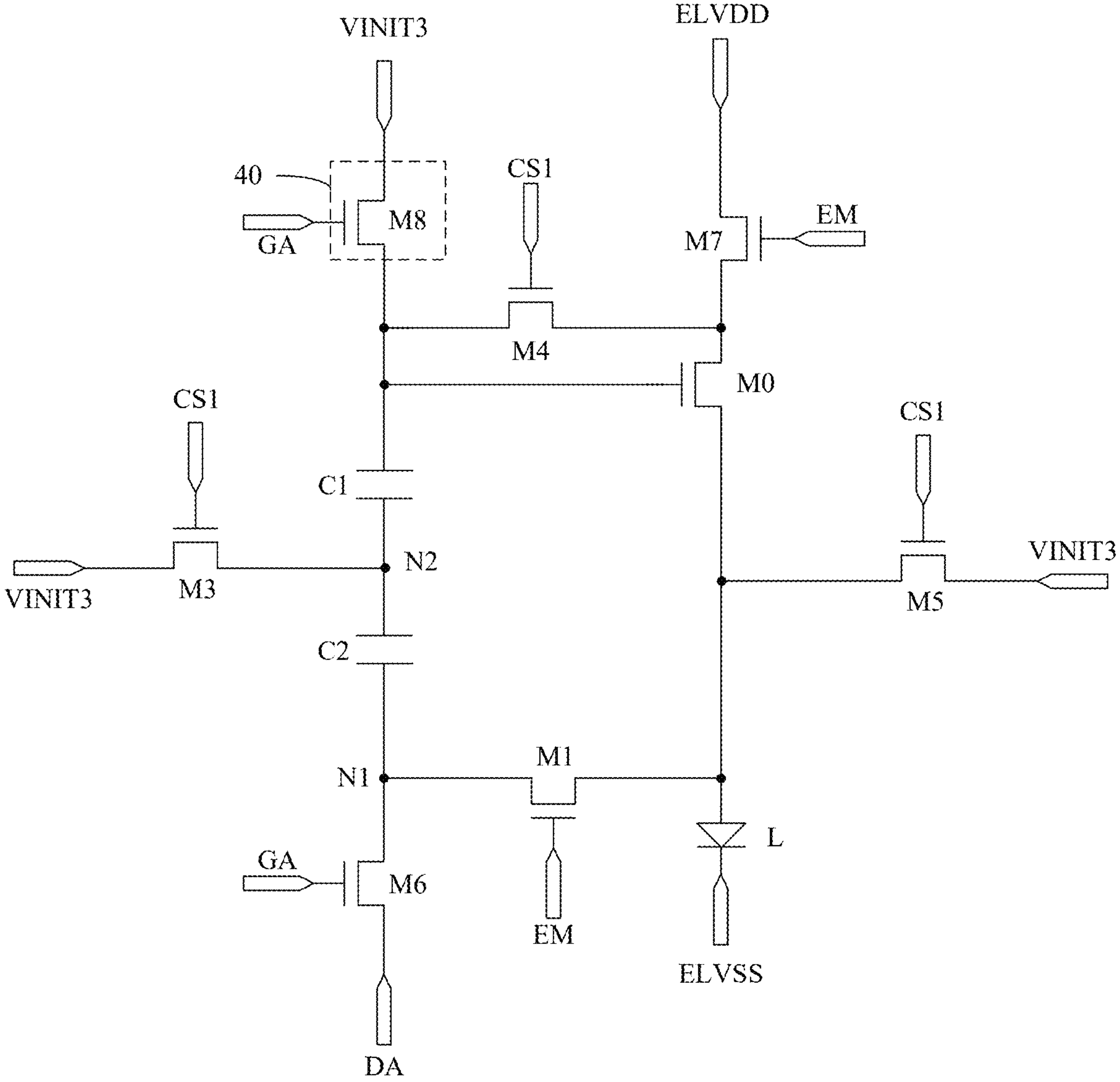
FIG. 15 is a specific schematic structural diagram of still some other pixel circuits according to an embodiment of the disclosure.

An embodiment of the disclosure provides some other schematic structural diagrams of the pixel circuit. As shown in FIG. 15, implementations in the above embodiments are modified. Only differences between the embodiment and the above embodiments will be described below, and similarities will not be repeated herein.

In the embodiment of the disclosure, as shown in FIG. 15, the pixel circuit further includes: a reset circuit 40. The reset circuit 40 is configured to provide a signal of a third initialization signal end VINIT3 for a gate electrode of a drive transistor M0 in response to a signal of a scanning signal end GA.

In the embodiment of the disclosure, as shown in FIG. 15, the reset circuit 40 includes: an eighth transistor M8. A gate electrode of the eighth transistor M8 is coupled to the scanning signal end GA. A first electrode of the eighth transistor M8 is coupled to the third initialization signal end VINIT3. A second electrode of the eighth transistor M8 is coupled to the gate electrode of the drive transistor M0.

For example, the eighth transistor M8 is turned on under control of an effective level of a scanning signal of the scanning signal end GA, and turned off under control of an ineffective level of the scanning signal. Optionally, if the eighth transistor M8 is an N-type transistor, the effective level and the ineffective level of the scanning signal are a high level and a low level respectively. Alternatively, if the eighth transistor M8 is a P-type transistor, the effective level and the ineffective level of the scanning signal are a low level and a high level respectively.

In the embodiment of the disclosure, a first compensation control signal end CS1 and a second compensation control signal end CS2 may be the same signal end. For example, as shown in FIG. 15, a gate electrode of a fourth transistor M4 is coupled to the first compensation control signal end CS1. In this way, a number of signal wires can be reduced, and wiring difficulty can be reduced.

In the embodiment of the disclosure, the first compensation control signal end CS1 and a third compensation control signal end CS3 may be the same signal end. For example, as shown in FIG. 15, a gate electrode of a fifth transistor M5 is coupled to the first compensation control signal end CS1. In this way, a number of signal wires can be reduced, and wiring difficulty can be reduced.

In the embodiment of the disclosure, a first initialization signal end VINIT1, a second initialization signal end VINIT2 and the third initialization signal end VINIT3 may be the same signal end. For example, as shown in FIG. 15, a second electrode of a third transistor M3 is coupled to the third initialization signal end VINIT3, and a first electrode of the fifth transistor M5 is coupled to the third initialization signal end VINIT3. In this way, a number of signal wires can be reduced, and wiring difficulty can be reduced.

In some examples, with a pixel drive circuit shown in FIG. 15 as an example, in combination with a signal sequence diagram shown in FIG. 16, a working process of the pixel circuit according to the embodiment of the disclosure will be described below.

Figure 16:
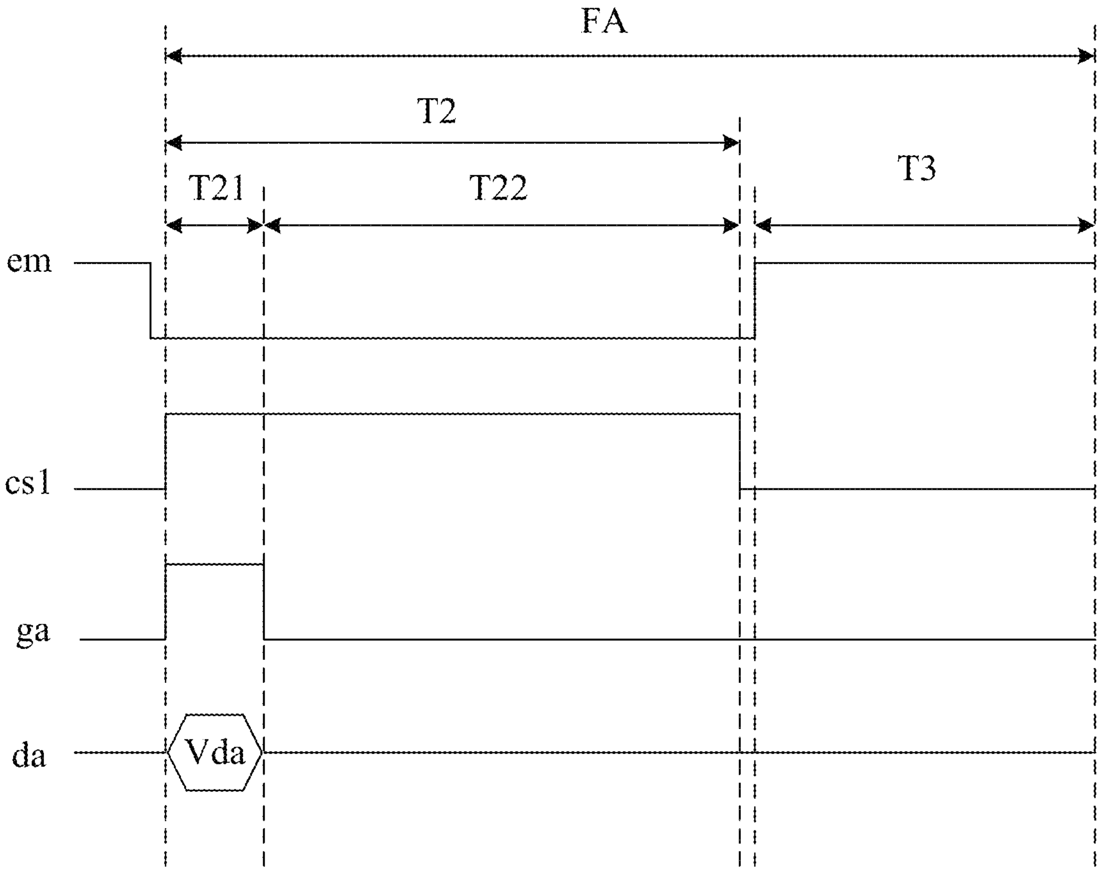
FIG. 16 is a signal sequence diagram of yet some other pixel circuits according to an embodiment of the disclosure.

In the embodiment of the disclosure, as shown in FIG. 16, em represents a light emitting control signal of a light emitting control signal end EM, cs1 represents a first compensation control signal of a first compensation control signal end CS1, ga represents a scanning signal of the scanning signal end GA, da represents a data voltage signal of a data signal end DA.

In addition, a threshold compensation and data writing stage T2 and a light emitting stage T3 in one display frame FA are selected.

In stage T21 of the threshold compensation and data writing stage T2, the third transistor M3, the fourth transistor M4 and the fifth transistor M5 are turned on under control of a high level of the first compensation control signal, the sixth transistor M6 and the eighth transistor M8 are turned on under control of a high level of the scanning signal, and the first transistor M1 and the seventh transistor M7 are turned off under control of a low level of the light emitting control signal. The third transistor M3 turned on provides a voltage Vint3 of a third initialization signal of the third initialization signal end VINIT3 for a second node N2, such that VN2=Vint3. The fifth transistor M5 turned on provides the third initialization signal of the third initialization signal end VINIT3 for the second electrode of the drive transistor M0, such that VM0s=Vint3. The eighth transistor M8 turned on provides the third initialization signal of the third initialization signal end VINIT3 for the gate electrode of the drive transistor M0, such that VM0g=Vint3. The fourth transistor M4 turned on turns on the gate electrode and the first electrode of the drive transistor M0, such that a voltage of the first electrode of the drive transistor M0 is Vint3. The sixth transistor M6 turned on inputs the data voltage Vda of the data signal end DA to the first node N1, such that VN1=Vda.

In stage T22 of the threshold compensation and data writing stage T2, the third transistor M3, the fourth transistor M4 and the fifth transistor M5 are turned on under control of the high level of the first compensation control signal, the sixth transistor M6 and the eighth transistor M8 are turned off under control of a low level of the scanning signal, and the first transistor M1 and the seventh transistor M7 are turned off under control of the low level of the light emitting control signal. The third transistor M3 turned on provides the third initialization signal of the third initialization signal end VINIT3 for the second node N2, such that VN2=Vint3. The fifth transistor M5 turned on provides the third initialization signal of the third initialization signal end VINIT3 for the second electrode of the drive transistor M0, such that VM0s=Vint3. The fourth transistor M4 turned on turns on the gate electrode and the first electrode of the drive transistor M0, such that the drive transistor M0 forms a diode connection mode. The voltage of the gate electrode of the drive transistor M0 is continuously discharged via the path from the fourth transistor M4, the drive transistor M0 and the fifth transistor M5 to the second initialization signal end VINIT2 until VM0g=Vint3+Vth. In this case, compensation of the threshold voltage is completed, and the drive transistor M0 is turned off.

In the light emitting stage T3, the third transistor M3, the fourth transistor M4 and the fifth transistor M5 are turned on under control of the high level of the first compensation control signal, the sixth transistor M6 and the eighth transistor M8 are turned off under control of the low level of the scanning signal, and the first transistor M1 and the seventh transistor M7 are turned off under control of the low level of the light emitting control signal. A first capacitor C1 and a second capacitor C2 are connected in series to form a new capacitor, and the voltage of the gate electrode of the drive transistor M0 is in a floating state. Since the seventh transistor M7 is turned on, the high voltage of the first power end ELVDD is input to the first electrode of the drive transistor M0, and the drive transistor M0 generates a drive current. The drive current flows through the drive transistor M0 so as to charge the anode of the light emitting device L, such that VM0s gradually rises to Vss+Voled. Voled is a voltage difference between a cathode and the anode of the light emitting device L during light emission. Due to a coupling effect of the first capacitor C1 and the second capacitor C2, variations of VM0s and VN2 may be coupled to the gate electrode of the drive transistor M0. If a voltage variation of the gate electrode of the drive transistor M0 is Vss+Voled−Vda, VM0g=Vint3+Vth+Vss+Voled−Vda. Therefore, if a voltage difference Vgs between the gate electrode and a source electrode of the drive transistor M0 is Vint3+Vth−Vda, the drive transistor M0 works in a saturation zone, and a drive current I generated may be expressed as: $I=K*(Vgs-Vth)^2=K*(Vint3-Vda)^2$. $K=1/2*\mu*Cox*W/L$, where μ denotes a mobility ratio of the drive transistor M0, Cox denotes capacitance of a gate insulating layer, and W/L denotes a channel width-length ratio of the drive transistor M0.

It may be seen from the above description that since the drive current I is not related to the threshold voltage Vth of the drive transistor M0, a second power voltage Vss of the second power end ELVSS and the Voled of the light emitting device L, the pixel circuit can solve problems of uneven compensation of the threshold voltage of the drive transistor M0, voltage drop of the second power voltage of the second power end ELVSS and uneven display caused by aging of the light emitting device L, so as to improve a display effect.

Moreover, in the stage T21, a process of compensating for the threshold voltage is implemented. In the stage T22, not only a process of writing the data voltage is implemented, but also the process of compensating for the threshold voltage is can be continuously implemented, and the data voltage is coupled to the gate electrode of the drive transistor M0 on the basis of a coupling effect of a capacitor. In the light emitting stage T3, the first capacitor C1 and the second capacitor C2 are connected in series to form a new capacitor, which is conducive to capacitor bootstrap.

In addition, since a path of compensating for the threshold voltage of the drive transistor M0 is different from a path of writing the data voltage, and compensation for the threshold voltage of the drive transistor M0 and writing of the data voltage are further conducted in a time-sharing manner, threshold voltage compensation of the drive transistor M0 and data voltage writing can be conducted separately. In this way, high-frequency driving can be implemented, and threshold voltage drift of the drive transistor M0 can be prevented from influencing light emission of the light emitting device L.

In addition, since the process of compensating for the threshold voltage of the drive transistor M0 and the process of writing the data voltage are separated, the process of compensating for the threshold voltage may be conducted for a long time, such that the threshold voltage of the drive transistor M0 can be better compensated for, and a drive speed can be increased, such as 120 Hz, 180 Hz, and 240 Hz, which is conducive to improvement in an effect of scenes in fields such as games; and precision of the drive current can be improved, display quality can be enhanced, and further light emitting stability and a display effect of the display panel can be improved.

Figure 17:
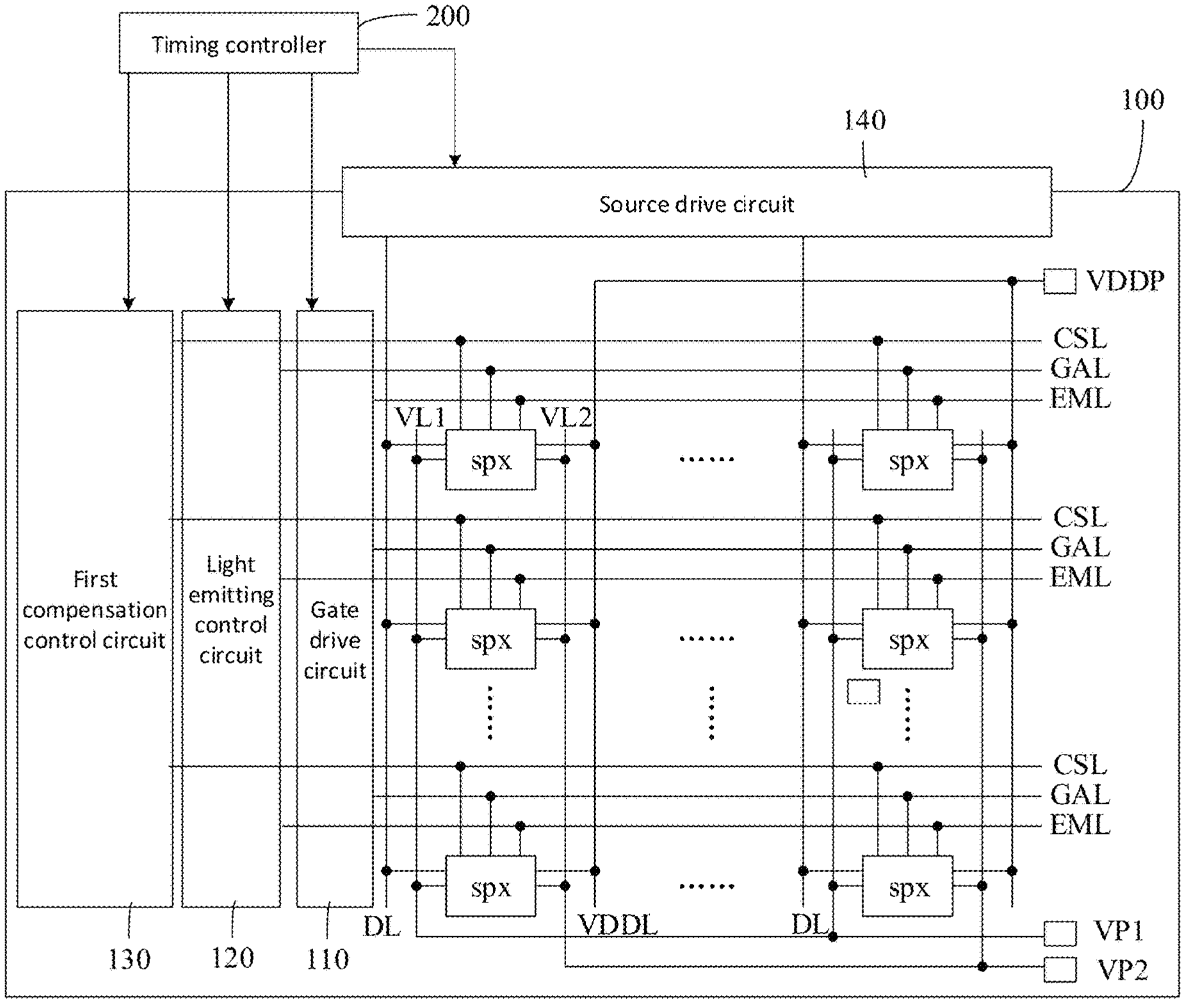
FIG. 17 is a schematic structural diagram of some display apparatuses according to an embodiment of the disclosure.

An embodiment of the disclosure further provides a display panel. As shown in FIG. 17, the display panel 100 includes: a plurality of pixel units arranged in an array. For example, each pixel unit includes a plurality of sub-pixels spx. Each sub-pixel spx includes the pixel circuit according to any one of the embodiments of the disclosure. A problem solving principle of the display panel is similar to that of the pixel circuit, so reference may be made to implementation of the pixel circuit for implementation of the display panel, which will not be repeated herein.

In some embodiments of the disclosure, as shown in FIG. 17, the display panel 100 further includes: a plurality of scanning signal lines GAL, a plurality of light emitting control signal lines EML, and a plurality of first compensation control signal lines CSL. The plurality of scanning signal lines GAL, the plurality of light emitting control signal lines EML and the plurality of first compensation control signal lines CSL extend in a row direction of the sub-pixels separately. Optionally, one scanning signal line GAL of the plurality of scanning signal lines GAL is coupled to a scanning signal end GA of a pixel circuit in a row of sub-pixels. One light emitting control signal line EML of the plurality of light emitting control signal lines EML is coupled to a light emitting control signal end EM of a pixel circuit in a row of sub-pixels. One compensation control signal line CSL of the plurality of first compensation control signal lines CSL is coupled to a first compensation control signal end CS1 of a pixel circuit in a row of sub-pixels.

In some embodiments of the disclosure, as shown in FIG. 17, the display panel 100 further includes: a plurality of data lines DL, a plurality of second initialization signal lines VL2, and a plurality of first power lines VDDL. The plurality of data lines DL, a plurality of first initialization signal lines VL1, the plurality of second initialization signal lines VL2 and the plurality of first power lines VDDL extend in a column direction of the sub-pixels separately. Optionally, one data line DL of the plurality of data lines DL is coupled to a data signal end DA of a pixel circuit in a column of sub-pixels. One second initialization signal line VL2 of the plurality of second initialization signal lines VL2 is coupled to a second initialization signal end VINIT2 of a pixel circuit in a column of sub-pixels. One first power line VDDL of the plurality of first power lines VDDL is coupled to a first power end ELVDD of a pixel circuit in a column of sub-pixels.

For example, as shown in FIG. 17, the display panel 100 further includes: a second initialization signal terminal VP2. The plurality of second initialization signal lines VL2 are connected to a second initialization signal bus. The second initialization signal bus is coupled to the second initialization signal terminal VP2.

For example, as shown in FIG. 17, the display panel 100 further includes: a first power terminal VDDP. The plurality of first power lines VDDL are connected to a first power bus, and the first power bus is coupled to the first power terminal VDDP.

In some embodiments of the disclosure, the display panel 100 further includes: a source drive circuit 140. The source drive circuit 140 is coupled to the plurality of data lines DL separately. For example, a number of the source drive circuit 140 may be one. Alternatively, a number of the source drive circuits may be two, where one of the source drive circuits is connected to one half of the data lines DL, and the other one source drive circuit is connected to the other half of the data lines DL. Clearly, a number of the source drive circuits may be three, four, or above, which may be designed and determined according to requirements of practical application, and is not limited by the disclosure.

In some embodiments of the disclosure, when the pixel circuit has a first initialization signal end VINIT1, as shown in FIG. 17, the display panel 100 further includes: a plurality of first initialization signal lines VL1. The plurality of first initialization signal lines VL1 extend in a column direction of the sub-pixels separately. Optionally, one first initialization signal line VL1 of the plurality of first initialization signal lines VL1 is coupled to a first initialization signal end VINIT1 of a pixel circuit in a column of sub-pixels.

For example, as shown in FIG. 17, the display panel 100 further includes: a first initialization signal terminal VP1. The plurality of first initialization signal lines VL1 are connected to a first initialization signal bus. The first initialization signal bus is coupled to the first initialization signal terminal VP1.

In some embodiments of the disclosure, when the pixel circuit has a third initialization signal end VINIT3, the display panel further includes: a plurality of third initialization signal lines. The plurality of third initialization signal lines extend in a column direction of the sub-pixels separately. Optionally, one third initialization signal line of the plurality of third initialization signal lines is coupled to the third initialization signal end VINIT3 of a pixel circuit in a column of sub-pixels.

For example, when a first initialization signal end VINIT1, a second initialization signal end VINIT2 and the third initialization signal end VINIT3 are the same signal end, a first initialization signal line may be used to input signals to the first initialization signal end VINIT1, the second initialization signal end VINIT2, and the third initialization signal end VINIT3.

For example, when a first initialization signal end VINIT1 and a second initialization signal end VINIT2 are the same signal end, a first initialization signal line may be used to input signals to the first initialization signal end VINIT1 and the second initialization signal end VINIT2.

For example, when a first initialization signal end VINIT1 and the third initialization signal end VINIT3 are the same signal end, a first initialization signal line may be used to input signals to the first initialization signal end VINIT1 and the third initialization signal end VINIT3.

For example, when a second initialization signal end VINIT2 and the third initialization signal end VINIT3 are the same signal end, a second initialization signal line may be used to input signals to the second initialization signal end VINIT2 and the third initialization signal end VINIT3.

In some embodiments of the disclosure, the display panel further includes: a gate drive circuit 110, a light emitting control circuit 120, and a first compensation control circuit 130. The gate drive circuit 110 is coupled to a plurality of scanning signal lines GAL separately. The light emitting control circuit 120 is coupled to a plurality of light emitting control signal lines EML separately. The first compensation control circuit 130 is coupled to a plurality of first compensation control signal lines CSL separately. In addition, the gate drive circuit 110 is configured to input scanning signals to the plurality of scanning signal lines GAL, the light emitting control circuit 120 is configured to input light emitting control signals to the plurality of light emitting control signal lines EML, and the first compensation control circuit 130 is configured to input first compensation control signals to the plurality of first compensation control signal lines CSL.

For example, when a first compensation control signal end CS1 and a second compensation control signal end CS2 are the same signal end, one of the plurality of first compensation control signal lines may be coupled to the second compensation control signal end of a pixel circuit in a row of sub-pixels. That is, the first compensation control signal line CSL may be used to input the first compensation control signals to the first compensation control signal end CS1 and the second compensation control signal end.

For example, when a first compensation control signal end CS1 and a third compensation control signal end CS3 are the same signal end, one of the plurality of first compensation control signal lines may be coupled to the third compensation control signal end of a pixel circuit in a row of sub-pixels. That is, the first compensation control signal line CSL may be used to input the first compensation control signals to the first compensation control signal end CS1 and the third compensation control signal end.

In the embodiment of the disclosure, a thin film transistor (TFT) may be manufactured on an array substrate of the display panel through a gate driver on array (GOA) technology, and the gate drive circuit 110, the light emitting control circuit 120 and the first compensation control circuit 130 may be formed. In this way, the gate drive circuit 110, the light emitting control circuit 120 and the first compensation control circuit 130 are all GOA circuits. Moreover, in the embodiment of the disclosure, by sharing the signal ends of the pixel circuit, an operation of the pixel circuit may be controlled only with three groups of GOA circuits. In this way, a number of GOA circuits can be reduced, which is conducive to implementation of narrow bezels.

For example, when the first compensation control signal end CS1 and the third compensation control signal end CS3 are different signal ends, the display panel further includes: a plurality of second compensation control signal lines. One of the plurality of second compensation control signal lines is coupled to a third compensation control signal end CS3 of a pixel circuit in a row of sub-pixels. In addition, the display panel further includes: second compensation control circuits coupled to the plurality of second compensation control signal lines respectively. The second compensation control circuits are configured to input third compensation control signals to the plurality of second compensation control signal lines.

An embodiment of the disclosure further provides a display apparatus. As shown in FIG. 17, the display apparatus may include: a display panel 100 and a timing controller 200. For example, the timing controller 200 receives display data of an image to be displayed of one display frame, and inputs corresponding control signals to a gate drive circuit 110, a light emitting control circuit 120 and a first compensation control circuit 130, such that the gate drive circuit 110 may output a corresponding scanning signal to a scanning signal line GAL, the light emitting control circuit 120 may output a corresponding light emitting control signal to a light emitting control signal line EML, and the first compensation control circuit 130 may output a corresponding compensation control signal to a compensation control signal line CSL. In addition, the timing controller 200 may further process the display data received and transmit the corresponding processed data to a source drive circuit 140. The source drive circuit 140 may input corresponding data voltages to data lines DL respectively according to the received display data, such that the pixel circuit may input the corresponding data voltage, so as to achieve an image display function of the display frame.

During specific implementation, in the embodiment of the disclosure, the display apparatus may be any product or component having a display function, such as a mobile phone, a tablet computer, a television, a display screen, a notebook computer, a digital photo frame, and a navigator. Other essential components of the display apparatus should be understood by those of ordinary skill in the art, which are not repeated herein and should not limit the disclosure.

Although preferred embodiments of the disclosure are described, those skilled in the art can still make additional changes and modifications to the embodiments once they learn the basic inventive concept. Therefore, the appended claims are intended to be interpreted as including the preferred embodiments and all changes and modifications falling within the scope of the disclosure.

Obviously, those skilled in the art can make various modifications and variations to the embodiments of the disclosure without departing from the spirit and scope of the embodiments of the disclosure. In this way, if these modifications and variations of the embodiments of the disclosure fall within the scope of the claims of the disclosure and their equivalent technologies, the disclosure is also intended to cover these modifications and variations.

What is claimed is:

1. A pixel circuit, comprising:

a light emitting device;

a drive transistor configured to generate a current for driving the light emitting device to emit light according to a data voltage;

a coupling control circuit coupled to a first node and a gate electrode and a second electrode of the drive transistor, and configured to stabilize voltages of the first node and the gate electrode of the drive transistor and to turn on the first node and the second electrode of the drive transistor in response to a signal of a light emitting control signal end;

a signal writing circuit coupled to the first node, and configured to provide a signal of a data signal end to the first node in response to a signal of a scanning signal end and to provide a signal of a first power end to a first electrode of the drive transistor in response to the signal of the light emitting control signal end; and a threshold compensation circuit coupled to the drive transistor, and configured to write a threshold voltage of the drive transistor to the gate electrode of the drive transistor;

wherein the coupling control circuit comprises: a first coupling sub-circuit, a second coupling sub-circuit, and a turning-on control circuit;

the first coupling sub-circuit is configured to stabilize the voltage of the gate electrode of the drive transistor and stabilize a voltage of a second node;

the second coupling sub-circuit is configured to stabilize the voltage of the second node and stabilize the voltage of the first node; and the turning-on control circuit is configured to turn on the first node and the second electrode of the drive transistor in response to the signal of the light emitting control signal end;

wherein the first coupling sub-circuit comprises: a first capacitor; and a first electrode plate of the first capacitor is coupled to the gate electrode of the drive transistor, and a second electrode plate of the first capacitor is coupled to the second node.

2. The pixel circuit according to claim 1, wherein the second coupling sub-circuit comprises: a second capacitor; and a first electrode plate of the second capacitor is coupled to the second node, and a second electrode plate of the second capacitor is coupled to the first node.

3. The pixel circuit according to claim 1, wherein the turning-on control circuit comprises: a first transistor; and a gate electrode of the first transistor is coupled to the light emitting control signal end, a first electrode of the first transistor is coupled to the first node, and a second electrode of the first transistor is coupled to the second electrode of the drive transistor.

4. The pixel circuit according to claim 3, wherein the second electrode of the drive transistor is directly coupled to the light emitting device; or the second electrode of the drive transistor is connected to the light emitting device by means of the first transistor, and the light emitting device is coupled to the first node.

5. The pixel circuit according to claim 1, wherein the threshold compensation circuit is further configured to initialize the first node, the second node, and the gate electrode, the first electrode and the second electrode of the drive transistor.

6. The pixel circuit according to claim 1, wherein the threshold compensation circuit comprises: a first threshold compensation sub-circuit, a second threshold compensation sub-circuit, and a third threshold compensation sub-circuit;

the first threshold compensation sub-circuit is configured to provide a signal of the second electrode of the drive transistor or a signal of a first initialization signal end to the second node in response to a signal of a first compensation control signal end;

the second threshold compensation sub-circuit is configured to turn on the gate electrode and the first electrode of the drive transistor in response to a signal of a second compensation control signal end; and the third threshold compensation sub-circuit is configured to provide a signal of a second initialization signal end or a signal of the second node to the second electrode of the drive transistor in response to a signal of a third compensation control signal end.

7. The pixel circuit according to claim 6, wherein in one display frame, maintenance duration of an effective level of at least one of the first compensation control signal end, the second compensation control signal end or the third compensation control signal end is longer than maintenance duration of an effective level of the scanning signal end;

in one display frame, an effective level of at least one of the first compensation control signal end, the second compensation control signal end or the third compensation control signal end comprises an overlapping duration with an effective level of the scanning signal end.

8. The pixel circuit according claim 6, wherein the first threshold compensation sub-circuit comprises: a third transistor; and a gate electrode of the third transistor is coupled to the first compensation control signal end, a first electrode of the third transistor is coupled to the second node, and a second electrode of the third transistor is coupled to the second electrode of the drive transistor or the first initialization signal end.

9. The pixel circuit according to claim 6, wherein the second threshold compensation sub-circuit comprises: a fourth transistor; and a gate electrode of the fourth transistor is coupled to the second compensation control signal end, a first electrode of the fourth transistor is coupled to the gate electrode of the drive transistor, and a second electrode of the fourth transistor is coupled to the first electrode of the drive transistor.

10. The pixel circuit according to claim 6, wherein the third threshold compensation sub-circuit comprises: a fifth transistor; and a gate electrode of the fifth transistor is coupled to the third compensation control signal end, a first electrode of the fifth transistor is coupled to the second initialization signal end, and a second electrode of the fifth transistor is coupled to the second electrode of the drive transistor.

11. The pixel circuit according to claim 6, wherein at least two of the first compensation control signal end, the second compensation control signal end and the third compensation control signal end are the same signal end.

12. The pixel circuit according to claim 6, wherein the first initialization signal end and the second initialization signal end are the same signal end.

13. The pixel circuit according to claim 6, wherein a cathode of the light emitting device is coupled to a second power end; and at least one of the first initialization signal end or the second initialization signal end is the same signal end as the second power end.

14. The pixel circuit according to claim 1, wherein the signal writing circuit comprises: a sixth transistor and a seventh transistor;

a gate electrode of the sixth transistor is coupled to the scanning signal end, a first electrode of the sixth transistor is coupled to the data signal end, and a second electrode of the sixth transistor is coupled to the first node; and a gate electrode of the seventh transistor is coupled to the light emitting control signal end, a first electrode of the seventh transistor is coupled to the first power end, and a second electrode of the seventh transistor is coupled to the first electrode of the drive transistor.

15. The pixel circuit according to claim 1, further comprising: a reset circuit, wherein the reset circuit is configured to provide a signal of a third initialization signal end to the gate electrode of the drive transistor in response to a signal of the scanning signal end;

wherein the reset circuit comprises: an eighth transistor; and a gate electrode of the eighth transistor is coupled to the scanning signal end, a first electrode of the eighth transistor is coupled to the third initialization signal end, and a second electrode of the eighth transistor is coupled to the gate electrode of the drive transistor.

16. A display panel, comprising:

a plurality of sub-pixels, wherein each of the plurality of sub-pixels comprises the pixel circuit according to claim 1.

17. The display panel according to claim 16, further comprising:

a plurality of scanning signal lines, wherein one of the plurality of scanning signal lines is coupled to a scanning signal end of a pixel circuit in a row of sub-pixels;

gate drive circuits coupled to the plurality of scanning signal lines respectively, wherein the gate drive circuits are configured to input gate drive signals to the plurality of scanning signal lines;

a plurality of light emitting control signal lines, wherein one of the plurality of light emitting control signal lines is coupled to a light emitting control signal end of a pixel circuit in a row of sub-pixels;

light emitting control circuits coupled to the plurality of light emitting control signal lines respectively, wherein the light emitting control circuits are configured to input light emitting control signals to the plurality of light emitting control signal lines;

a plurality of first compensation control signal lines, wherein one of the plurality of first compensation control signal lines is coupled to a first compensation control signal end of a pixel circuit in a row of sub-pixels; and first compensation control circuits coupled to the plurality of first compensation control signal lines respectively, wherein the first compensation control circuits are configured to input first compensation control signals to the plurality of first compensation control signal lines;

wherein one of the plurality of first compensation control signal lines is coupled to a second compensation control signal end of a pixel circuit in a row of sub-pixels; and/or, one of the plurality of first compensation control signal lines is coupled to a third compensation control signal end of a pixel circuit in a row of sub-pixels.

18. A drive method for the pixel circuit according to claim 1, involving a threshold compensation and data writing stage and a light emitting stage in each of a plurality of consecutive display frames, and comprising:

in the threshold compensation and data writing stage, writing, by a threshold compensation circuit, a threshold voltage of a drive transistor to a gate electrode of the drive transistor; providing, by a signal writing circuit, a signal of a data signal end for a first node in response to a signal of a scanning signal end; and stabilizing, by a coupling control circuit, voltages of the first node and the gate electrode of the drive transistor; and in the light emitting stage, providing, by the signal writing circuit, a signal of a first power end for a first electrode of the drive transistor in response to a signal of a light emitting control signal end; turning on, by the coupling control circuit, the first node and a second electrode of the drive transistor in response to the signal of the light emitting control signal end; stabilizing, by the coupling control circuit, the voltages of the first node and the gate electrode of the drive transistor; and generating, by the drive transistor, a drive current for driving a light emitting device to emit light according to a data voltage, so as to drive the light emitting device to emit light.

19. The drive method according to claim 18, wherein before the threshold compensation and data writing stage, the drive method further involves an initialization stage, and comprises:

in the initialization stage, providing, by the signal writing circuit, the signal of the first power end for the first electrode of the drive transistor in response to the signal of the light emitting control signal end; turning on, by the coupling control circuit, the first node and the second electrode of the drive transistor in response to the signal of the light emitting control signal end; stabilizing, by the coupling control circuit, the voltages of the first node and the gate electrode of the drive transistor; and initializing, by the threshold compensation circuit, the first node, a second node, and the gate electrode, the first electrode and the second electrode of the drive transistor.

* * * * *